(12) United States Patent
Madduri et al.

(10) Patent No.: US 11,809,867 B2
(45) Date of Patent: *Nov. 7, 2023

(54) APPARATUS AND METHOD FOR PERFORMING DUAL SIGNED AND UNSIGNED MULTIPLICATION OF PACKED DATA ELEMENTS

(71) Applicant: Intel Corporation, Santa Clara, CA (US)

(72) Inventors: Venkateswara Madduri, Austin, TX (US); Elmoustapha Ould-Ahmed-Vall, Chandler, AZ (US); Jesus Corbal, King City, OR (US); Mark Charney, Lexington, MA (US); Robert Valentine, Kiryat Tivon (IL); Binwei Yang, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 3 days.

This patent is subject to a terminal disclaimer.

(21) Appl. No.: 17/027,230

(22) Filed: Sep. 21, 2020

(65) Prior Publication Data

US 2021/0004227 A1 Jan. 7, 2021

Related U.S. Application Data

(63) Continuation of application No. 15/721,412, filed on Sep. 29, 2017, now Pat. No. 10,802,826.

(51) Int. Cl.
*G06F 9/30* (2018.01)
*G06F 7/00* (2006.01)

(52) U.S. Cl.
CPC ............. *G06F 9/3001* (2013.01); *G06F 7/00* (2013.01); *G06F 9/30014* (2013.01); *G06F 9/3016* (2013.01); *G06F 9/30036* (2013.01)

(58) Field of Classification Search
CPC ...... G06F 9/3001; G06F 7/00; G06F 9/30014; G06F 9/30036; G06F 9/3016;
(Continued)

(56) References Cited

U.S. PATENT DOCUMENTS 4,202,039 A 5/1980 Epenoy et al.
4,937,775 A 6/1990 Engeler et al.
(Continued)

FOREIGN PATENT DOCUMENTS

FR 2793971 A1 11/2000
WO 2013/095552 A1 6/2013
WO 2018/075052 A1 4/2018

OTHER PUBLICATIONS

Notice of Allowance, U.S. Appl. No. 15/721,145, dated Dec. 9, 2021, 2 pages.
(Continued)

*Primary Examiner* — Corey S Faherty
(74) *Attorney, Agent, or Firm* — NICHOLSON DE VOS WEBSTER & ELLIOTT LLP

(57) ABSTRACT

An apparatus and method for performing dual concurrent multiplications of packed data elements. For example one embodiment of a processor comprises: a decoder to decode a first instruction to generate a decoded instruction; a first source register to store a first plurality of packed byte data elements; a second source register to store a second plurality of packed byte data elements; execution circuitry to execute the decoded instruction, the execution circuitry comprising: multiplier circuitry to concurrently multiply each of the packed byte data elements of the first plurality with a corresponding packed byte data element of the second plurality to generate a plurality of products; adder circuitry to add specified sets of the products to generate temporary results for each set of products; zero-extension or sign-extension circuitry to zero-extend or sign-extend the tem-
(Continued)

porary result for each set to generate an extended temporary result for each set; accumulation circuitry to combine each of the extended temporary results with a selected packed data value stored in a third source register to generate a plurality of final results; and a destination register to store the plurality of final results as a plurality of packed data elements in specified data element positions.

24 Claims, 24 Drawing Sheets

(58) Field of Classification Search
CPC ............. G06F 9/30098; G06F 9/30145; G06F 9/3889; G06F 9/3893
See application file for complete search history.

(56) References Cited

U.S. PATENT DOCUMENTS

| | | | |
|---|---|---|---|
| 5,119,484 A | | 6/1992 | Fox |
| 5,170,370 A | | 12/1992 | Lee et al. |
| 5,175,862 A | | 12/1992 | Phelps et al. |
| 5,442,577 A | | 8/1995 | Cohen |
| 5,583,804 A | * | 12/1996 | Seal .................... G06F 7/5443 |
| | | | 708/523 |
| 5,721,892 A | | 2/1998 | Peleg et al. |
| 5,784,305 A | * | 7/1998 | Nadehara ............. G06F 7/5338 |
| | | | 708/523 |
| 5,862,067 A | | 1/1999 | Mennemeier et al. |
| 5,880,985 A | | 3/1999 | Makineni et al. |
| 5,936,872 A | | 8/1999 | Fischer et al. |
| 5,953,241 A | | 9/1999 | Hansen et al. |
| 5,983,253 A | | 11/1999 | Fischer et al. |
| 5,996,066 A | | 11/1999 | Yung |
| 6,058,408 A | | 5/2000 | Fischer et al. |
| 6,237,016 B1 | | 5/2001 | Fischer et al. |
| 6,272,512 B1 | | 8/2001 | Golliver et al. |
| 6,366,937 B1 | | 4/2002 | Shridhar et al. |
| 6,385,634 B1 | | 5/2002 | Peleg et al. |
| 6,470,370 B2 | | 10/2002 | Fischer et al. |
| 6,523,055 B1 | | 2/2003 | Yu et al. |
| 6,542,916 B1 | | 4/2003 | Hinds et al. |
| 6,609,140 B1 | | 8/2003 | Greene |
| 6,675,187 B1 | | 1/2004 | Greenberger |
| 6,823,353 B2 | | 11/2004 | Fischer et al. |
| 6,826,587 B1 | | 11/2004 | Montalvo et al. |
| 7,062,526 B1 | | 6/2006 | Hoyle |
| 7,072,929 B2 | | 7/2006 | Pechanek et al. |
| 7,219,212 B1 | | 5/2007 | Sanghavi et al. |
| 7,392,368 B2 | | 6/2008 | Khan et al. |
| 7,424,594 B2 | | 9/2008 | Pitsianis et al. |
| 7,428,566 B2 | * | 9/2008 | Siu ....................... G06F 9/30014 |
| | | | 712/E9.071 |
| 7,546,329 B2 | | 6/2009 | Taunton |
| 7,546,330 B2 | | 6/2009 | Taunton |
| 7,555,514 B2 | | 6/2009 | Pedersen et al. |
| 7,593,978 B2 | | 9/2009 | Schulte et al. |
| 7,873,812 B1 | | 1/2011 | Mimar |
| 7,890,566 B1 | | 2/2011 | Zbiciak |
| 7,962,719 B2 | | 6/2011 | Pitsianis et al. |
| 8,229,991 B2 | | 7/2012 | Tran |
| 8,271,571 B2 | | 9/2012 | Matsuyama et al. |
| 8,443,170 B2 | | 5/2013 | Wilder et al. |
| 8,458,442 B2 | | 6/2013 | Eichenberger et al. |
| 8,595,280 B2 | | 11/2013 | Symes et al. |
| 8,650,240 B2 | | 2/2014 | Eichenberger et al. |
| 8,904,152 B2 | | 12/2014 | Pitsianis et al. |
| 9,015,354 B2 | | 4/2015 | Pitsianis et al. |
| 9,104,510 B1 | | 8/2015 | Rub |
| 9,118,631 B1 | | 8/2015 | Yung et al. |
| 9,411,583 B2 | | 8/2016 | Sair et al. |
| 9,465,611 B2 | | 10/2016 | Taunton et al. |
| 9,489,197 B2 | | 11/2016 | Rahman et al. |
| 9,519,460 B1 | | 12/2016 | Farooqui et al. |
| 9,778,905 B1 | | 10/2017 | Walke |
| 9,910,671 B2 | | 3/2018 | Li et al. |
| 10,180,820 B2 | | 1/2019 | Buchanan et al. |
| 11,074,073 B2 | * | 7/2021 | Madduri ............. G06F 9/30018 |
| 11,169,802 B2 | * | 11/2021 | Valentine ............. G06F 7/5443 |
| 11,256,504 B2 | | 2/2022 | Madduri et al. |
| 2002/0004809 A1 | | 1/2002 | Golliver et al. |
| 2002/0169813 A1 | | 11/2002 | Pechanek et al. |
| 2003/0009502 A1 | | 1/2003 | Katayanagi |
| 2003/0014457 A1 | | 1/2003 | Desai et al. |
| 2003/0014458 A1 | | 1/2003 | Fischer et al. |
| 2003/0084083 A1 | | 5/2003 | Hull et al. |
| 2003/0088601 A1 | | 5/2003 | Pitsianis et al. |
| 2004/0078404 A1 | | 4/2004 | Macy et al. |
| 2004/0117422 A1 | | 6/2004 | Debes et al. |
| 2004/0210616 A1 | | 10/2004 | Debes et al. |
| 2004/0221137 A1 | | 11/2004 | Pitsianis et al. |
| 2005/0071414 A1 | | 3/2005 | Taunton |
| 2005/0071415 A1 | | 3/2005 | Mark |
| 2005/0078773 A1 | | 4/2005 | Astrachan |
| 2005/0172106 A1 | | 8/2005 | Ford et al. |
| 2005/0182813 A1 | | 8/2005 | Cho et al. |
| 2005/0193185 A1 | | 9/2005 | Taunton et al. |
| 2005/0198473 A1 | | 9/2005 | Ford |
| 2006/0015702 A1 | | 1/2006 | Khan et al. |
| 2007/0192399 A1 | | 8/2007 | Krithivasan et al. |
| 2007/0239968 A1 | | 10/2007 | Moyer et al. |
| 2008/0046704 A1 | | 2/2008 | Tanaka et al. |
| 2008/0222486 A1 | | 9/2008 | Richardson et al. |
| 2008/0270768 A1 | | 10/2008 | Khan et al. |
| 2008/0288756 A1 | | 11/2008 | Johnson et al. |
| 2008/0301414 A1 | | 12/2008 | Pitsianis et al. |
| 2009/0055455 A1 | | 2/2009 | Matsuyama et al. |
| 2010/0274990 A1 | | 10/2010 | Wilder et al. |
| 2011/0225224 A1 | | 9/2011 | Pitsianis et al. |
| 2012/0072704 A1 | * | 3/2012 | Johnson ................. G06F 17/16 |
| | | | 712/223 |
| 2012/0166511 A1 | | 6/2012 | Hiremath et al. |
| 2012/0284464 A1 | | 11/2012 | Padaki et al. |
| 2012/0284487 A1 | | 11/2012 | Saha et al. |
| 2013/0262547 A1 | | 10/2013 | Peleg et al. |
| 2013/0268794 A1 | | 10/2013 | Hancock |
| 2013/0275731 A1 | | 10/2013 | Sair et al. |
| 2014/0164733 A1 | | 6/2014 | Jha |
| 2014/0188968 A1 | | 7/2014 | Kaul et al. |
| 2014/0189231 A1 | | 7/2014 | Maydan et al. |
| 2014/0304493 A1 | | 10/2014 | Zhong et al. |
| 2014/0379774 A1 | | 12/2014 | Gupta et al. |
| 2015/0019842 A1 | | 1/2015 | Rahman et al. |
| 2015/0039856 A1 | | 2/2015 | Pitsianis et al. |
| 2015/0143078 A1 | | 5/2015 | Khan et al. |
| 2015/0149744 A1 | | 5/2015 | Pedersen |
| 2015/0339101 A1 | | 11/2015 | Dupont et al. |
| 2016/0140079 A1 | | 5/2016 | Kravitz et al. |
| 2016/0179523 A1 | | 6/2016 | Ould-Ahmed-Vall et al. |
| 2016/0224514 A1 | | 8/2016 | Moudgill et al. |
| 2017/0161069 A1 | | 6/2017 | Yokota et al. |
| 2018/0095758 A1 | | 4/2018 | Dubtsov et al. |
| 2018/0113708 A1 | | 4/2018 | Corbal et al. |
| 2019/0102193 A1 | | 4/2019 | Madduri et al. |
| 2019/0163472 A1 | | 5/2019 | Valentine et al. |
| 2019/0163473 A1 | | 5/2019 | Valentine et al. |

OTHER PUBLICATIONS

Notice of Allowance, U.S. Appl. No. 15/721,448, dated Nov. 22, 2021, 2 pages.
Notice of Allowance, U.S. Appl. No. 15/721,145, dated Oct. 13, 2021, 7 pages.
Notice of Allowance, U.S. Appl. No. 15/721,448, dated Oct. 27, 2021, 9 pages.
5.6. Negative Values—Two's Complement—CS160 Reader, Available Online at <http://computerscience.chemeketa.edu>, Jul. 2016, 3 pages.
Abu Taha M., et al., "A Practical One Way Hash Algorithm Based on Matrix Multiplication," International Journal of Computer Applications, vol. 23 (2), Jun. 2011, 5 pages.

(56) References Cited

OTHER PUBLICATIONS

Agrawal D. P., et al., "On Multiple Operand Addition of Signed Binary Numbers," IEEE Transactions on Computers, vol. c-27, No. 11, Nov. 1978, pp. 1068-1070.
Bacon D., "CSEP 5901v: Quantum Computing," Jun. 29, 2005, 64 pages.
Dolmatov V., et al., "GOST R 34.11-2012: Hash Function," Aug. 2013, 64 pages.
Ex Parte Quayle Action, U.S. Appl. No. 15/721,145, Sep. 6, 2019, 9 pages.
Ex Parte Quayle Action, U.S. Appl. No. 15/721,145, Jan. 13, 2020, 7 pages.
Final Office Action, U.S. Appl. No. 15/721,225, dated Jan. 14, 2020, 7 pages.
Final Office Action, U.S. Appl. No. 15/721,313, dated Sep. 10, 2019, 17 pages.
Final Office Action, U.S. Appl. No. 15/721,448, dated Feb. 11, 2020, 19 pages.
Final Office Action, U.S. Appl. No. 15/721,458, dated May 3, 2019, 17 pages.
Final Office Action, U.S. Appl. No. 15/721,529, dated Mar. 21, 2019, 10 pages.
Final Office Action, U.S. Appl. No. 15/721,616, dated Oct. 28, 2019, 28 pages.
Final Office Action, U.S. Appl. No. 15/721,627, dated Oct. 28, 2019, 29 pages.
Hamamreh R., et al., "Hash Algorithm for Data Integrity Based on Matrix Combination," The 14th International Arab Conference on Information Technology (ACIT'2013), Feb. 2014, 5 pages.
Hilewitz et al., "Advanced Bit Manipulation Instruction Set Architecture," Princeton University, Nov. 2006, 17 pages.
Hilewitz et al., "Bit Matrix Multiplication in Commodity Processors" 2008 International Conference on Application-Specific Systems, Architectures and Processors, 2008, pp. 7-12.
Mahajan N.V., et al., "Simple Computation of DIT FFT," International Journal of Advanced Research in Computer Science and Software Engineering, May 2014, vol. 4 (5), pp. 353-356.
Mathcentre., "The Complex Conjugate", Available Online at <http://www.mathcentre.ac.uk/resources/sigma%20complex%20number"/20leaflets/sigma-complex6-2009-1.pdf>, 2009, 1 page.
Non-Final Office Action, U.S. Appl. No. 15/721,145, dated Apr. 4, 2019, 17 pages.
Non-Final Office Action, U.S. Appl. No. 15/721,225, dated Aug. 13, 2019, 20 pages.
Non-Final Office Action, U.S. Appl. No. 15/721,261, dated Mar. 15, 2019, 10 pages.
Non-Final Office Action, U.S. Appl. No. 15/721,313, dated Apr. 16, 2019, 18 pages.
Non-Final Office Action, U.S. Appl. No. 15/721,448, dated Aug. 25, 2020, 46 pages.
Non-Final Office Action, U.S. Appl. No. 15/721,448, dated Jun. 19, 2019, 13 pages.
Non-Final Office Action, U.S. Appl. No. 15/721,448, dated Nov. 16, 2018, 17 pages.
Non-Final Office Action, U.S. Appl. No. 15/721,458, dated Dec. 5, 2018, 18 pages.
Non-Final Office Action, U.S. Appl. No. 15/721,464, dated May 15, 2019, 22 pages.
Non-Final Office Action, U.S. Appl. No. 15/721,529, dated Nov. 19, 2018, 10 pages.
Non-Final Office Action, U.S. Appl. No. 15/721,616, dated Mar. 21, 2019, 27 pages.
Non-Final Office Action, U.S. Appl. No. 15/721,627, dated Mar. 21, 2019, 27 pages.
Non-Final Office Action, U.S. Appl. No. 16/672,203, dated May 15, 2020, 6 pages.
Non-Final Office Action, U.S. Appl. No. 16/691,327, dated Jun. 1, 2020, 6 pages.
Notice of Allowability, U.S. Appl. No. 15/721,412, dated Jun. 1, 2020, 5 pages.
Notice of Allowance, U.S. Appl. No. 15/721,145, dated Jun. 26, 2020, 7 pages.
Notice of Allowance, U.S. Appl. No. 15/721,261, dated Aug. 14, 2019, 8 pages.
Notice of Allowance, U.S. Appl. No. 15/721,261, dated Nov. 12, 2019, 6 pages.
Notice of Allowance, U.S. Appl. No. 15/721,313, dated Jan. 22, 2020, 10 pages.
Notice of Allowance, U.S. Appl. No. 15/721,412, dated Feb. 13, 2019, 8 pages.
Notice of Allowance, U.S. Appl. No. 15/721,459, dated Mar. 6, 2019, 5 pages.
Notice of Allowance, U.S. Appl. No. 15/721,459, dated Feb. 13, 2019, 9 pages.
Notice of Allowance, U.S. Appl. No. 15/721,459, dated Jun. 15, 2020, 5 pages.
Notice of Allowance, U.S. Appl. No. 15/721,464, dated Jan. 8, 2020, 5 pages.
Notice of Allowance, U.S. Appl. No. 15/721,464, dated Aug. 29, 2019, 24 pages.
Notice of Allowance, U.S. Appl. No. 15/721,529, dated Sep. 5, 2019, 5 pages.
Notice of Allowance, U.S. Appl. No. 15/721,599, dated Feb. 28, 2019, 8 pages.
Notice of Allowance, U.S. Appl. No. 15/721,599, dated Jun. 12, 2020, 5 pages.
Restriction Election Requirement, U.S. Appl. No. 15/721,225, dated Jan. 9, 2019, 6 pages.
Ryan T., "How Do You Find the Product of 7-2i and its Conjugate?: from Socratic", Available Online at <https://socratic.org/questions/how-do-you-find-the-product-of-7-2i-and-its-conjugate>, Dec. 24, 2015, 1 page.
Slade G. W., "The Fast Fourier Transfonm in Hardware: A Tutorial Based on an FPGA Implementation", Mar. 21, 2013, pp. 1-26.
Final Rejection dated Jan. 26, 2021 for U.S. Appl. No. 15/721,448.
Notice of Allowance and Fees Due (PTOL-85) dated Dec. 17, 2020 for U.S. Appl. No. 16/672,203.
Notice of Allowance, U.S. Appl. No. 16/691,327, dated Oct. 21, 2020, 7 pages.
Ex Parte Quayle Action, U.S. Appl. No. 15/721,145, Jun. 10, 2021, 7 pages.
Non-Final Office Action, U.S. Appl. No. 15/721,448, dated Jun. 11, 2021, 44 pages.
Notice of Allowance, U.S. Appl. No. 15/721,225, dated Apr. 2, 2021, 8 pages.
Non-Final Office Action, U.S. Appl. No. 17/226,986, dated May 10, 2022, 10 pages.
Stack Overflow, "Binary Matrix Multiplication Bit Twiddling Hack", Available Online at <http://stackoverflow.com/questions/18447321/binary-matrix-multiplication-bit-twiddling-hack>, Aug. 26, 20137 pages.
Van Amstel D., "Efficient and Scalable Bit-Matrix Multiplication in Bit-Slice Format", ACM SAC 2012, Mar. 2012, 6 pages.
Van, Zee F.G., et al., "Implementing High-Performance Complex Matrix Multiplication via the 3m and 4m Methods," ACM Transactions on Mathematical Software, 2016, pp. 0:1-0:36.
Non-Final Office Action, U.S. Appl. No. 17/380,930, dated Jul. 27, 2022, 10 pages.
Notice of Allowance, U.S. Appl. No. 17/156,119, dated Sep. 16, 2022, 9 pages.
Advisory Action, U.S. App. No. 17/380,930, dated Mar. 6, 2023, 2 pages.
Final Office Action, U.S. Appl. No. 17/380,930, dated Dec. 27, 2022, 8 pages.
Notice of Allowance, U.S. Appl. No. 17/226,986, dated Oct. 17, 2022, 9 pages.
Igor Kholodov, "CIS-77 Introduction to Computer Systems, Instruction Format Design", retrieved from URL: http://www.c-jump.com/CIS77/CPU/IsaDesign/lecture.html, Jan. 23, 2010, 18 pages.
Lemuet, C., et al., "The Potential Energy Efficiency of Vector Acceleration", In: Proceedings of the 2006 ACM/IEEE Conference on Supercomputing, Nov. 11, 2006, 10 pages.

(56) References Cited

OTHER PUBLICATIONS

Office Action, DE App. No. 102018010454.1, dated Mar. 10, 2023, 18 pages of Original Document Only.
Roth, A., et al., "CIS 371: Digital Systems Organization and Design", Unit 1: Instruction Set Architectures, Jan. 25, 2011, 20 pages.
Corrected Notice of Allowability, U.S. Appl. No. 17/672,504, dated Jan. 20, 2023, 2 pages.
Notice of Allowance, U.S. Appl. No. 17/672,504, dated Jan. 17, 2023, 10 pages.
Notice of Allowance, U.S. Appl. No. 17/672,504, dated Apr. 24, 2023, 9 pages.

\* cited by examiner

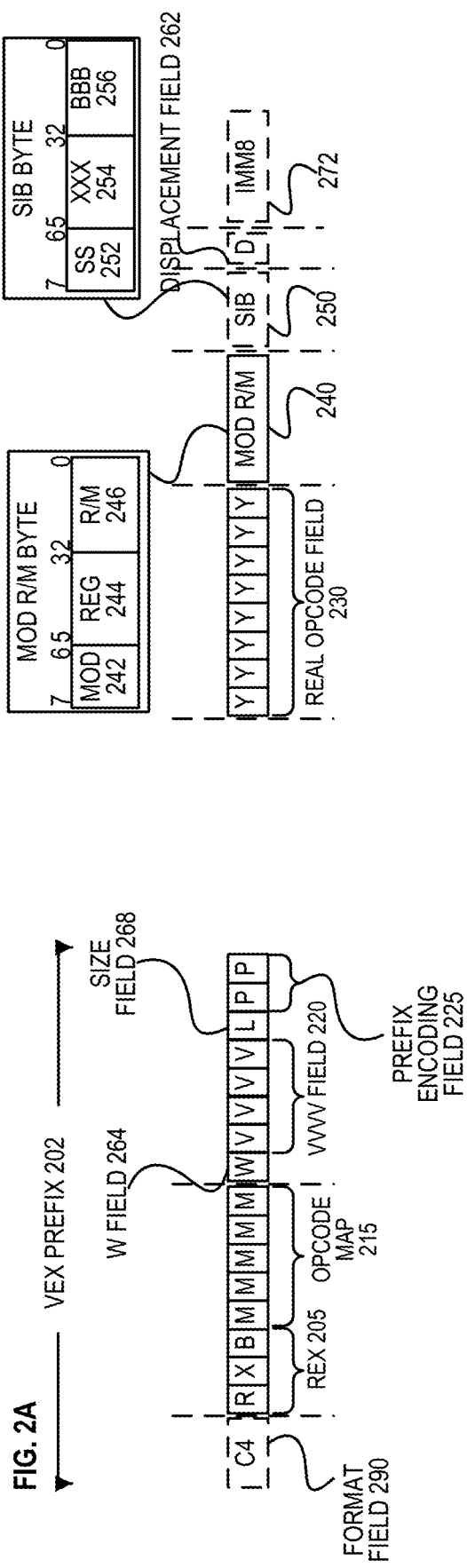
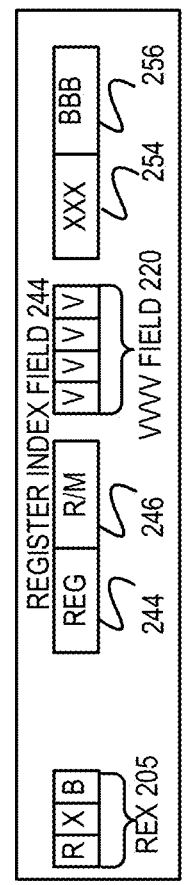
FIG. 2A
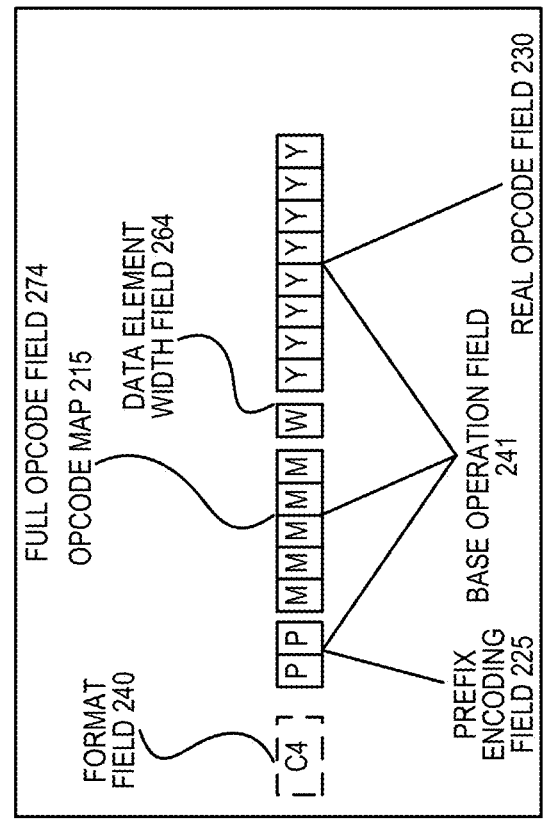
FIG. 2B
FIG. 2C

FIG. 3
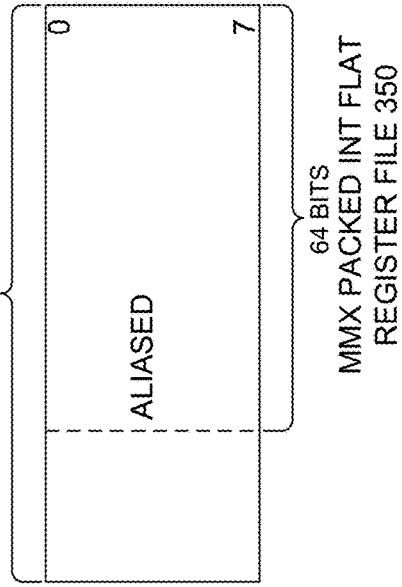
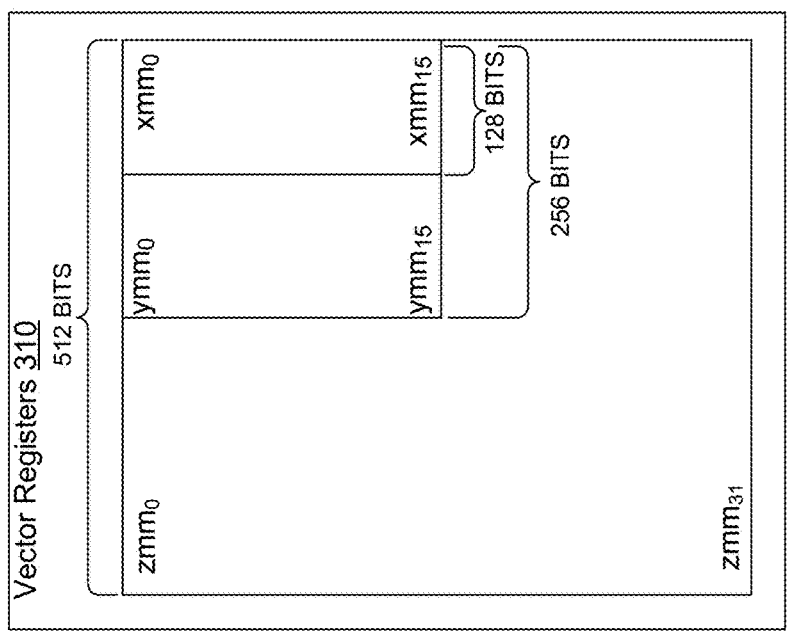

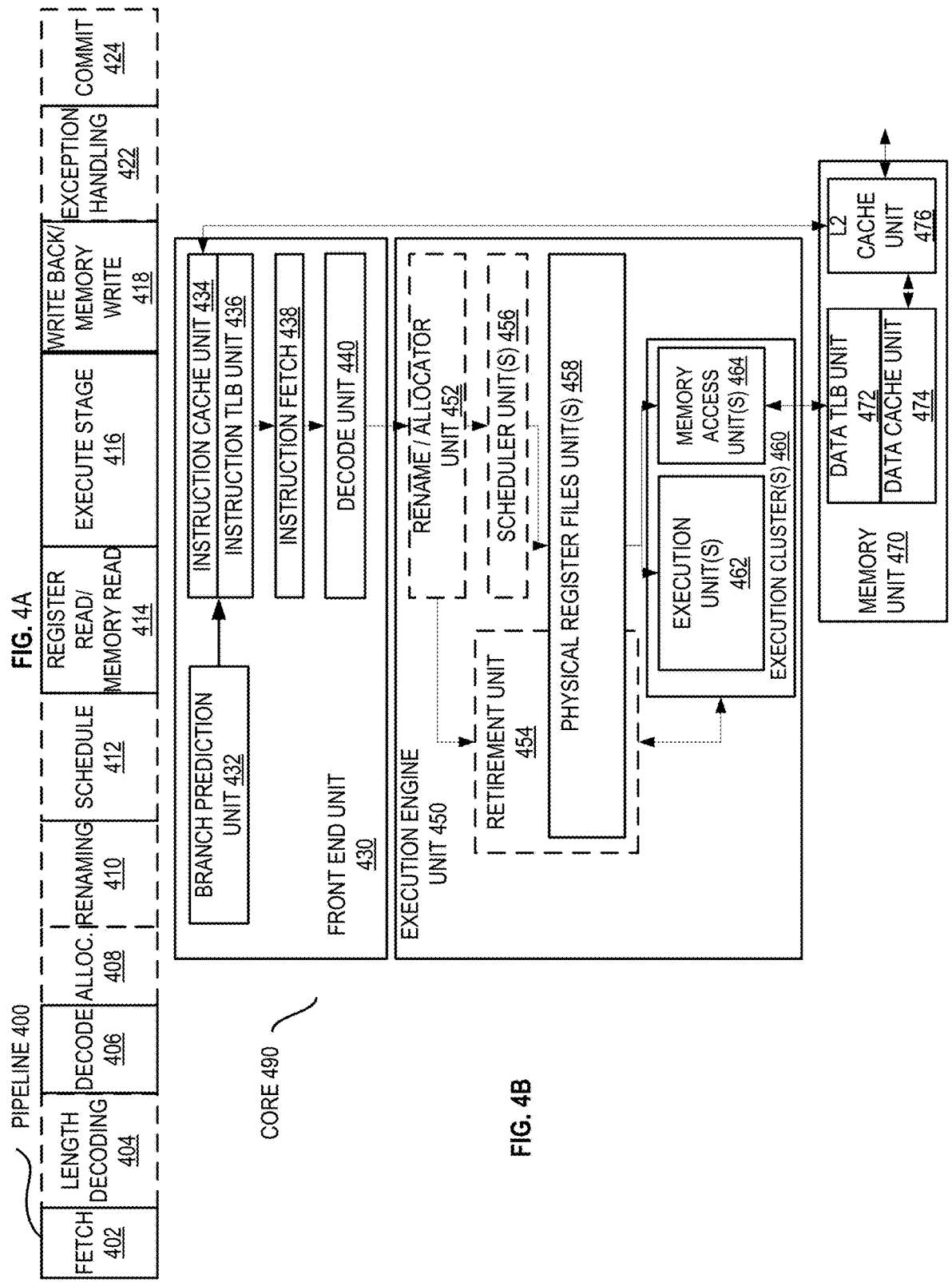

Fig. 13

| SRCx | 127:112 | 111:96 | 95:80 | 79:64 | 63:48 | 47:32 | 31:16 | 15:0 |
|---|---|---|---|---|---|---|---|---|
|  | H | G | F | E | D | C | B | A |

| SRCx | 127:96 | 95:64 | 63:32 | 31:0 |
|---|---|---|---|---|
|  | H-G | F-E | D-C | B-A |

| SRCx | 127:64 | 63:0 |
|---|---|---|
|  | H-E | D-A |

APPARATUS AND METHOD FOR PERFORMING DUAL SIGNED AND UNSIGNED MULTIPLICATION OF PACKED DATA ELEMENTS

BACKGROUND

Field of the Invention

The embodiments of the invention relate generally to the field of computer processors. More particularly, the embodiments relate to an apparatus and method for performing dual signed and unsigned multiplication of packed data elements.

Description of the Related Art

An instruction set, or instruction set architecture (ISA), is the part of the computer architecture related to programming, including the native data types, instructions, register architecture, addressing modes, memory architecture, interrupt and exception handling, and external input and output (I/O). It should be noted that the term "instruction" generally refers herein to macro-instructions—that is instructions that are provided to the processor for execution—as opposed to micro-instructions or micro-ops—that is the result of a processor's decoder decoding macro-instructions. The micro-instructions or micro-ops can be configured to instruct an execution unit on the processor to perform operations to implement the logic associated with the macro-instruction.

The ISA is distinguished from the microarchitecture, which is the set of processor design techniques used to implement the instruction set. Processors with different microarchitectures can share a common instruction set. For example, Intel® Pentium 4 processors, Intel® Core™ processors, and processors from Advanced Micro Devices, Inc. of Sunnyvale Calif. implement nearly identical versions of the x86 instruction set (with some extensions that have been added with newer versions), but have different internal designs. For example, the same register architecture of the ISA may be implemented in different ways in different microarchitectures using well-known techniques, including dedicated physical registers, one or more dynamically allocated physical registers using a register renaming mechanism (e.g., the use of a Register Alias Table (RAT), a Reorder Buffer (ROB) and a retirement register file). Unless otherwise specified, the phrases register architecture, register file, and register are used herein to refer to that which is visible to the software/programmer and the manner in which instructions specify registers. Where a distinction is required, the adjective "logical," "architectural," or "software visible" will be used to indicate registers/files in the register architecture, while different adjectives will be used to designate registers in a given microarchitecture (e.g., physical register, reorder buffer, retirement register, register pool).

Multiply-accumulate is a common digital signal processing operation which computes the product of two numbers and adds that product to an accumulated value. Existing single instruction multiple data (SIMD) microarchitectures implement multiply-accumulate operations by executing a sequence of instructions. For example, a multiply-accumulate may be performed with a multiply instruction, followed by a 4-way addition, and then an accumulation with the destination quadword data to generate two 64-bit saturated results.

BRIEF DESCRIPTION OF THE DRAWINGS

A better understanding of the present invention can be obtained from the following detailed description in conjunction with the following drawings, in which:

FIGS. 2A-C are block diagrams illustrating an exemplary VEX instruction format according to embodiments of the invention;

FIG. 3 is a block diagram of a register architecture according to one embodiment of the invention; and FIG. 4A is a block diagram illustrating both an exemplary in-order fetch, decode, retire pipeline and an exemplary register renaming, out-of-order issue/execution pipeline according to embodiments of the invention;

FIG. 4B is a block diagram illustrating both an exemplary embodiment of an in-order fetch, decode, retire core and an exemplary register renaming, out-of-order issue/execution architecture core to be included in a processor according to embodiments of the invention;

FIG. 13 illustrates a plurality of packed data elements containing real and complex values in accordance with one embodiment;

DETAILED DESCRIPTION

In the following description, for the purposes of explanation, numerous specific details are set forth in order to provide a thorough understanding of the embodiments of the invention described below. It will be apparent, however, to one skilled in the art that the embodiments of the invention may be practiced without some of these specific details. In other instances, well-known structures and devices are shown in block diagram form to avoid obscuring the underlying principles of the embodiments of the invention.

Exemplary Processor Architectures, Instruction Formats, and Data Types

An instruction set includes one or more instruction formats. A given instruction format defines various fields (number of bits, location of bits) to specify, among other things, the operation to be performed (opcode) and the operand(s) on which that operation is to be performed. Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands.

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 1A:
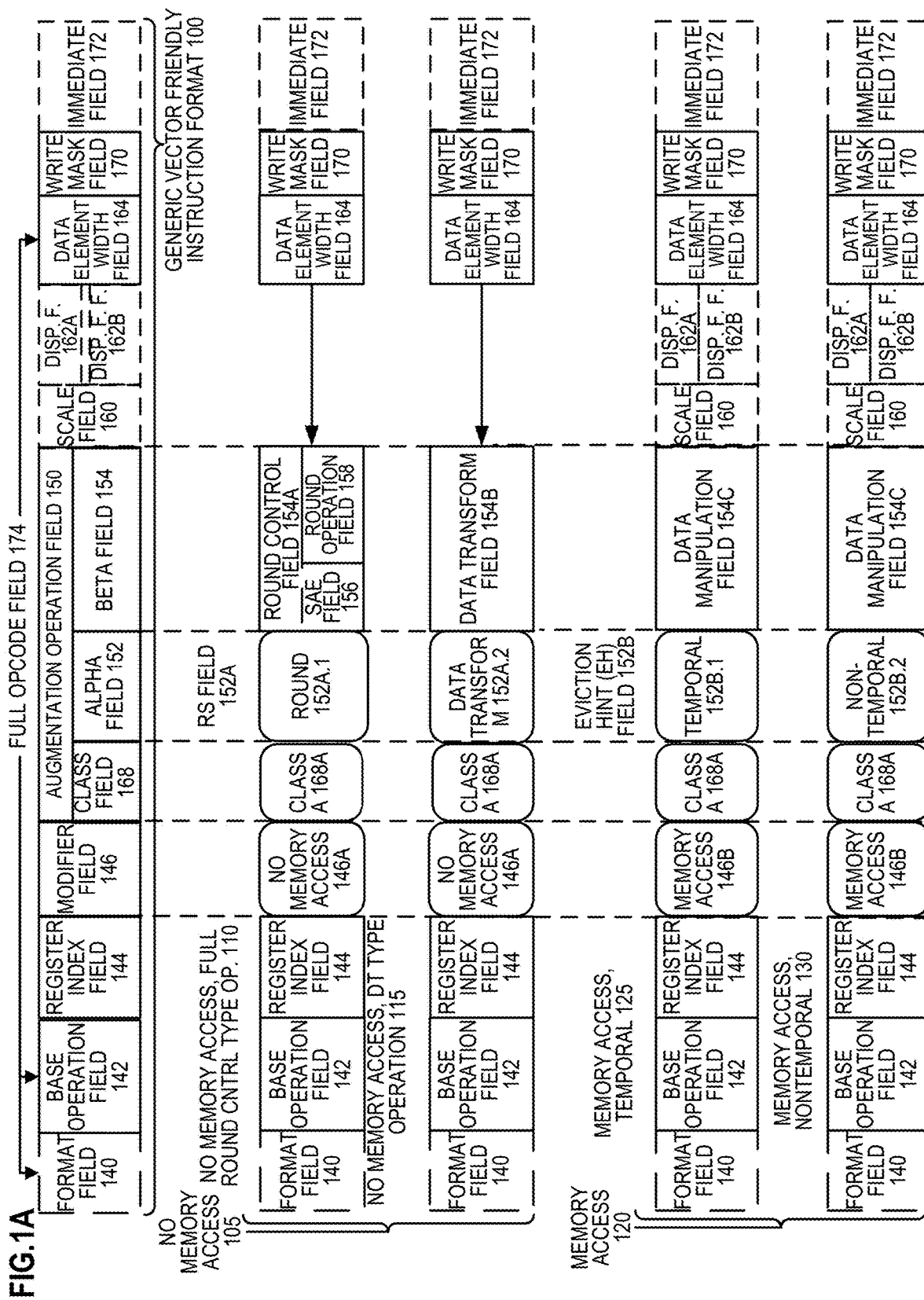
FIGS. 1A and 1B are block diagrams illustrating a generic vector friendly instruction format and instruction templates thereof according to embodiments of the invention.
Figure 1B:
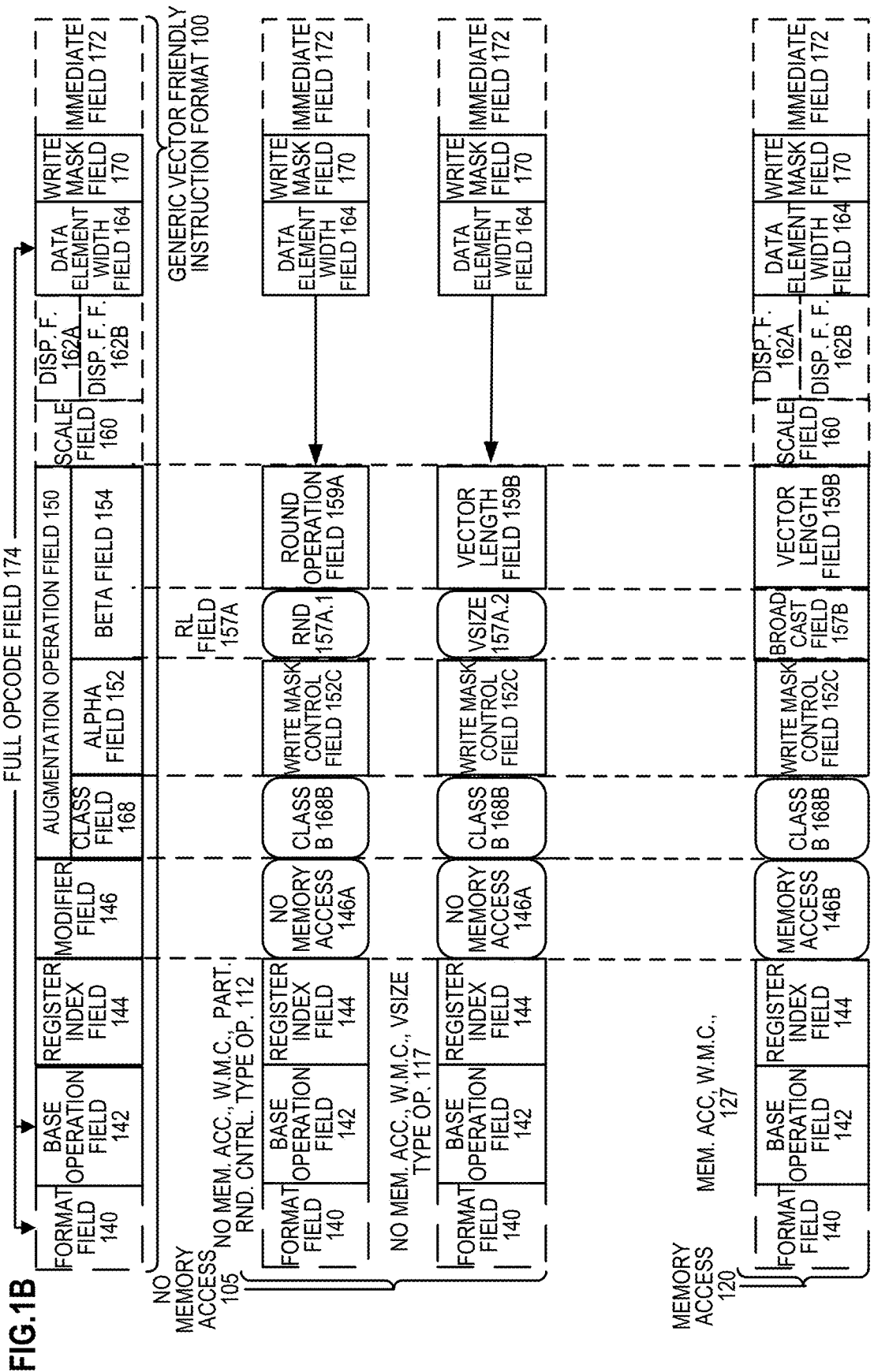

FIGS. 1A-1B are block diagrams illustrating a generic vector friendly instruction format and instruction templates thereof according to embodiments of the invention. FIG. 1A is a block diagram illustrating a generic vector friendly instruction format and class A instruction templates thereof according to embodiments of the invention; while FIG. 1B is a block diagram illustrating the generic vector friendly instruction format and class B instruction templates thereof according to embodiments of the invention. Specifically, a generic vector friendly instruction format 100 for which are defined class A and class B instruction templates, both of which include no memory access 105 instruction templates and memory access 120 instruction templates. The term generic in the context of the vector friendly instruction format refers to the instruction format not being tied to any specific instruction set.

While embodiments of the invention will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 1A include: 1) within the no memory access 105 instruction templates there is shown a no memory access, full round control type operation 110 instruction template and a no memory access, data transform type operation 115 instruction template; and 2) within the memory access 120 instruction templates there is shown a memory access, temporal 125 instruction template and a memory access, non-temporal 130 instruction template. The class B instruction templates in FIG. 1B include: 1) within the no memory access 105 instruction templates there is shown a no memory access, write mask control, partial round control type operation 112 instruction template and a no memory access, write mask control, vsize type operation 117 instruction template; and 2) within the memory access 120 instruction templates there is shown a memory access, write mask control 127 instruction template.

The generic vector friendly instruction format 100 includes the following fields listed below in the order illustrated in FIGS. 1A-1B.

Format field 140—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 142—its content distinguishes different base operations.

Register index field 144—its content, directly or through address generation, specifies the locations of the source and destination operands, be they in registers or in memory. These include a sufficient number of bits to select N registers from a P×Q (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 146—its content distinguishes occurrences of instructions in the generic vector instruction format that specify memory access from those that do not; that is, between no memory access 105 instruction templates and memory access 120 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 150—its content distinguishes which one of a variety of different operations to be performed in addition to the base operation. This field is context specific. In one embodiment of the invention, this field is divided into a class field 168, an alpha field 152, and a beta field 154. The augmentation operation field 150 allows common groups of operations to be performed in a single instruction rather than 2, 3, or 4 instructions.

Scale field 160—its content allows for the scaling of the index field's content for memory address generation (e.g., for address generation that uses $2^{scale}*$index+base).

Displacement Field 162A—its content is used as part of memory address generation (e.g., for address generation that uses $2^{scale}*$index+base+displacement).

Displacement Factor Field 162B (note that the juxtaposition of displacement field 162A directly over displacement factor field 162B indicates one or the other is used)—its content is used as part of address generation; it specifies a displacement factor that is to be scaled by the size of a memory access (N)—where N is the number of bytes in the memory access (e.g., for address generation that uses $2^{scale}*$index+base+scaled displacement). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 174 (described later herein) and the data manipulation field 154C. The displacement field 162A and the displacement factor field 162B are optional in the sense that they are not used for the no memory access 105 instruction templates and/or different embodiments may implement only one or none of the two.

Data element width field 164—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 170—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 170 allows for partial vector operations, including loads, stores, arithmetic, logical, etc. While embodiments of the invention are described in which the write mask field's 170 content selects one of a number of write mask registers that contains the write mask to be used (and thus the write mask field's 170 content indirectly identifies that masking to be performed), alternative embodiments instead or additional allow the mask write field's 170 content to directly specify the masking to be performed.

Immediate field 172—its content allows for the specification of an immediate. This field is optional in the sense that is it not present in an implementation of the generic vector friendly format that does not support immediate and it is not present in instructions that do not use an immediate.

Class field 168—its content distinguishes between different classes of instructions. With reference to FIGS. 1A-B, the contents of this field select between class A and class B instructions. In FIGS. 1A-B, rounded corner squares are used to indicate a specific value is present in a field (e.g., class A 168A and class B 168B for the class field 168 respectively in FIGS. 1A-B).

Instruction Templates of Class A

In the case of the non-memory access 105 instruction templates of class A, the alpha field 152 is interpreted as an RS field 152A, whose content distinguishes which one of the different augmentation operation types are to be performed (e.g., round 152A.1 and data transform 152A.2 are respectively specified for the no memory access, round type operation 110 and the no memory access, data transform type operation 115 instruction templates), while the beta field 154 distinguishes which of the operations of the specified type is to be performed. In the no memory access 105 instruction templates, the scale field 160, the displacement field 162A, and the displacement scale filed 162B are not present.

No-Memory Access Instruction Templates—Full Round Control Type Operation

In the no memory access full round control type operation 110 instruction template, the beta field 154 is interpreted as a round control field 154A, whose content(s) provide static rounding. While in the described embodiments of the invention the round control field 154A includes a suppress all floating point exceptions (SAE) field 156 and a round operation control field 158, alternative embodiments may support may encode both these concepts into the same field or only have one or the other of these concepts/fields (e.g., may have only the round operation control field 158).

SAE field 156—its content distinguishes whether or not to disable the exception event reporting; when the SAE field's 156 content indicates suppression is enabled, a given instruction does not report any kind of floating-point exception flag and does not raise any floating point exception handler.

Round operation control field 158—its content distinguishes which one of a group of rounding operations to perform (e.g., Round-up, Round-down, Round-towards-zero and Round-to-nearest). Thus, the round operation control field 158 allows for the changing of the rounding mode on a per instruction basis. In one embodiment of the invention where a processor includes a control register for specifying rounding modes, the round operation control field's 150 content overrides that register value.

No Memory Access Instruction Templates—Data Transform Type Operation

In the no memory access data transform type operation 115 instruction template, the beta field 154 is interpreted as a data transform field 154B, whose content distinguishes which one of a number of data transforms is to be performed (e.g., no data transform, swizzle, broadcast).

In the case of a memory access 120 instruction template of class A, the alpha field 152 is interpreted as an eviction hint field 152B, whose content distinguishes which one of the eviction hints is to be used (in FIG. 1A, temporal 152B.1 and non-temporal 152B.2 are respectively specified for the memory access, temporal 125 instruction template and the memory access, non-temporal 130 instruction template), while the beta field 154 is interpreted as a data manipulation field 154C, whose content distinguishes which one of a number of data manipulation operations (also known as primitives) is to be performed (e.g., no manipulation; broadcast; up conversion of a source; and down conversion of a destination). The memory access 120 instruction templates include the scale field 160, and optionally the displacement field 162A or the displacement scale field 162B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 152 is interpreted as a write mask control (Z) field 152C, whose content distinguishes whether the write masking controlled by the write mask field 170 should be a merging or a zeroing.

In the case of the non-memory access 105 instruction templates of class B, part of the beta field 154 is interpreted as an RL field 157A, whose content distinguishes which one of the different augmentation operation types are to be performed (e.g., round 157A.1 and vector length (VSIZE) 157A.2 are respectively specified for the no memory access, write mask control, partial round control type operation 112 instruction template and the no memory access, write mask control, VSIZE type operation 117 instruction template), while the rest of the beta field 154 distinguishes which of the operations of the specified type is to be performed. In the no memory access 105 instruction templates, the scale field 160, the displacement field 162A, and the displacement scale filed 162B are not present.

In the no memory access, write mask control, partial round control type operation 110 instruction template, the rest of the beta field 154 is interpreted as a round operation field 159A and exception event reporting is disabled (a given instruction does not report any kind of floating-point exception flag and does not raise any floating point exception handler).

Round operation control field 159A—just as round operation control field 158, its content distinguishes which one of a group of rounding operations to perform (e.g., Round-up, Round-down, Round-towards-zero and Round-to-nearest). Thus, the round operation control field 159A allows for the changing of the rounding mode on a per instruction basis. In one embodiment of the invention where a processor includes a control register for specifying rounding modes, the round operation control field's 150 content overrides that register value.

In the no memory access, write mask control, VSIZE type operation 117 instruction template, the rest of the beta field 154 is interpreted as a vector length field 159B, whose content distinguishes which one of a number of data vector lengths is to be performed on (e.g., 128, 256, or 512 byte).

In the case of a memory access 120 instruction template of class B, part of the beta field 154 is interpreted as a broadcast field 157B, whose content distinguishes whether or not the broadcast type data manipulation operation is to be performed, while the rest of the beta field 154 is interpreted the vector length field 159B. The memory access 120 instruction templates include the scale field 160, and optionally the displacement field 162A or the displacement scale field 162B.

With regard to the generic vector friendly instruction format 100, a full opcode field 174 is shown including the format field 140, the base operation field 142, and the data element width field 164. While one embodiment is shown where the full opcode field 174 includes all of these fields, the full opcode field 174 includes less than all of these fields in embodiments that do not support all of them. The full opcode field 174 provides the operation code (opcode).

The augmentation operation field 150, the data element width field 164, and the write mask field 170 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the invention, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the invention). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments of the invention. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

VEX Instruction Format

VEX encoding allows instructions to have more than two operands, and allows SIMD vector registers to be longer than 28 bits. The use of a VEX prefix provides for three-operand (or more) syntax. For example, previous two-operand instructions performed operations such as A=A+B, which overwrites a source operand. The use of a VEX prefix enables operands to perform nondestructive operations such as A=B+C.

FIG. 2A illustrates an exemplary AVX instruction format including a VEX prefix 202, real opcode field 230, Mod R/M byte 240, SIB byte 250, displacement field 262, and IMM8 272. FIG. 2B illustrates which fields from FIG. 2A make up a full opcode field 274 and a base operation field 241. FIG. 2C illustrates which fields from FIG. 2A make up a register index field 244.

VEX Prefix (Bytes 0-2) 202 is encoded in a three-byte form. The first byte is the Format Field 290 (VEX Byte 0, bits [7:0]), which contains an explicit C4 byte value (the unique value used for distinguishing the C4 instruction format). The second-third bytes (VEX Bytes 1-2) include a number of bit fields providing specific capability. Specifically, REX field 205 (VEX Byte 1, bits [7-5]) consists of a VEX.R bit field (VEX Byte 1, bit [7]-R), VEX.X bit field (VEX byte 1, bit [6]-X), and VEX.B bit field (VEX byte 1, bit[5]-B). Other fields of the instructions encode the lower three bits of the register indexes as is known in the art (rrr, xxx, and bbb), so that Rrrr, Xxxx, and Bbbb may be formed by adding VEX.R, VEX.X, and VEX.B. Opcode map field 215 (VEX byte 1, bits [4:0]-mmmmm) includes content to encode an implied leading opcode byte. W Field 264 (VEX byte 2, bit [7]-W)—is represented by the notation VEX.W, and provides different functions depending on the instruction. The role of VEX.vvvv 220 (VEX Byte 2, bits [6:3]-vvvv) may include the following: 1) VEX.vvvv encodes the first source register operand, specified in inverted (1s complement) form and is valid for instructions with 2 or more source operands; 2) VEX.vvvv encodes the destination register operand, specified in 1s complement form for certain vector shifts; or 3) VEX.vvvv does not encode any operand, the field is reserved and should contain 1111b. If VEX.L 268 Size field (VEX byte 2, bit [2]-L)=0, it indicates 28 bit vector; if VEX.L=1, it indicates 256 bit vector. Prefix encoding field 225 (VEX byte 2, bits [1:0]-pp) provides additional bits for the base operation field 241.

Real Opcode Field 230 (Byte 3) is also known as the opcode byte. Part of the opcode is specified in this field.

MOD R/M Field 240 (Byte 4) includes MOD field 242 (bits [7-6]), Reg field 244 (bits [5-3]), and R/M field 246 (bits [2-0]). The role of Reg field 244 may include the following: encoding either the destination register operand or a source register operand (the rrr of Rrrr), or be treated as an opcode extension and not used to encode any instruction operand. The role of R/M field 246 may include the following: encoding the instruction operand that references a memory address, or encoding either the destination register operand or a source register operand.

Scale, Index, Base (SIB)—The content of Scale field 250 (Byte 5) includes SS252 (bits [7-6]), which is used for memory address generation. The contents of SIB.xxx 254 (bits [5-3]) and SIB.bbb 256 (bits [2-0]) have been previously referred to with regard to the register indexes Xxxx and Bbbb.

The Displacement Field 262 and the immediate field (IMM8) 272 contain data.

Exemplary Register Architecture

FIG. 3 is a block diagram of a register architecture 300 according to one embodiment of the invention. In the embodiment illustrated, there are 32 vector registers 310 that are 512 bits wide; these registers are referenced as zmm0 through zmm31. The lower order 256 bits of the lower 6 zmm registers are overlaid on registers ymm0-15. The lower order 128 bits of the lower 6 zmm registers (the lower order 128 bits of the ymm registers) are overlaid on registers xmm0-15.

General-purpose registers 325—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 345, on which is aliased the MMX packed integer flat register file 350—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the invention may use wider or narrower registers. Additionally, alternative embodiments of the invention may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures. Detailed herein are circuits (units) that comprise exemplary cores, processors, etc.

Exemplary Core Architectures

FIG. 4A is a block diagram illustrating both an exemplary in-order pipeline and an exemplary register renaming, out-of-order issue/execution pipeline according to embodiments of the invention. FIG. 4B is a block diagram illustrating both an exemplary embodiment of an in-order architecture core and an exemplary register renaming, out-of-order issue/execution architecture core to be included in a processor according to embodiments of the invention. The solid lined boxes in FIGS. 4A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 4A, a processor pipeline 400 includes a fetch stage 402, a length decode stage 404, a decode stage 406, an allocation stage 408, a renaming stage 410, a scheduling (also known as a dispatch or issue) stage 412, a register read/memory read stage 414, an execute stage 416, a write back/memory write stage 418, an exception handling stage 422, and a commit stage 424.

FIG. 4B shows processor core 490 including a front end unit 430 coupled to an execution engine unit 450, and both are coupled to a memory unit 470. The core 490 may be a reduced instruction set computing (RISC) core, a complex instruction set computing (CISC) core, a very long instruction word (VLIW) core, or a hybrid or alternative core type. As yet another option, the core 490 may be a special-purpose core, such as, for example, a network or communication core, compression engine, coprocessor core, general purpose computing graphics processing unit (GPGPU) core, graphics core, or the like.

The front end unit 430 includes a branch prediction unit 432 coupled to an instruction cache unit 434, which is coupled to an instruction translation lookaside buffer (TLB) 436, which is coupled to an instruction fetch unit 438, which is coupled to a decode unit 440. The decode unit 440 (or decoder) may decode instructions, and generate as an output one or more micro-operations, micro-code entry points, microinstructions, other instructions, or other control signals, which are decoded from, or which otherwise reflect, or are derived from, the original instructions. The decode unit 440 may be implemented using various different mechanisms. Examples of suitable mechanisms include, but are not limited to, look-up tables, hardware implementations, programmable logic arrays (PLAs), microcode read only memories (ROMs), etc. In one embodiment, the core 490 includes a microcode ROM or other medium that stores microcode for certain macroinstructions (e.g., in decode unit 440 or otherwise within the front end unit 430). The decode unit 440 is coupled to a rename/allocator unit 452 in the execution engine unit 450.

The execution engine unit 450 includes the rename/allocator unit 452 coupled to a retirement unit 454 and a set of one or more scheduler unit(s) 456. The scheduler unit(s) 456 represents any number of different schedulers, including reservations stations, central instruction window, etc. The scheduler unit(s) 456 is coupled to the physical register file(s) unit(s) 458. Each of the physical register file(s) units 458 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 458 comprises a vector registers unit and a scalar registers unit. These register units may provide architectural vector registers, vector mask registers, and general purpose registers. The physical register file(s) unit(s) 458 is overlapped by the retirement unit 454 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 454 and the physical register file(s) unit(s) 458 are coupled to the execution cluster(s) 460. The execution cluster(s) 460 includes a set of one or more execution units 462 and a set of one or more memory access units 464. The execution units 462 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 456, physical register file(s) unit(s) 458, and execution cluster(s) 460 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 464). It should also be understood that where separate pipelines are used, one or more of these pipelines may be out-of-order issue/execution and the rest in-order.

The set of memory access units 464 is coupled to the memory unit 470, which includes a data TLB unit 472 coupled to a data cache unit 474 coupled to a level 2 (L2) cache unit 476. In one exemplary embodiment, the memory access units 464 may include a load unit, a store address unit, and a store data unit, each of which is coupled to the data TLB unit 472 in the memory unit 470. The instruction cache unit 434 is further coupled to a level 2 (L2) cache unit 476 in the memory unit 470. The L2 cache unit 476 is coupled to one or more other levels of cache and eventually to a main memory.

By way of example, the exemplary register renaming, out-of-order issue/execution core architecture may implement the pipeline 400 as follows: 1) the instruction fetch 438 performs the fetch and length decoding stages 402 and 404; 2) the decode unit 440 performs the decode stage 406; 3) the rename/allocator unit 452 performs the allocation stage 408 and renaming stage 410; 4) the scheduler unit(s) 456 performs the schedule stage 412; 5) the physical register file(s) unit(s) 458 and the memory unit 470 perform the register read/memory read stage 414; the execution cluster 460 perform the execute stage 416; 6) the memory unit 470 and the physical register file(s) unit(s) 458 perform the write back/memory write stage 418; 7) various units may be involved in the exception handling stage 422; and 8) the retirement unit 454 and the physical register file(s) unit(s) 458 perform the commit stage 424.

The core 490 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 490 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 434/474 and a shared L2 cache unit 476, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 5B:
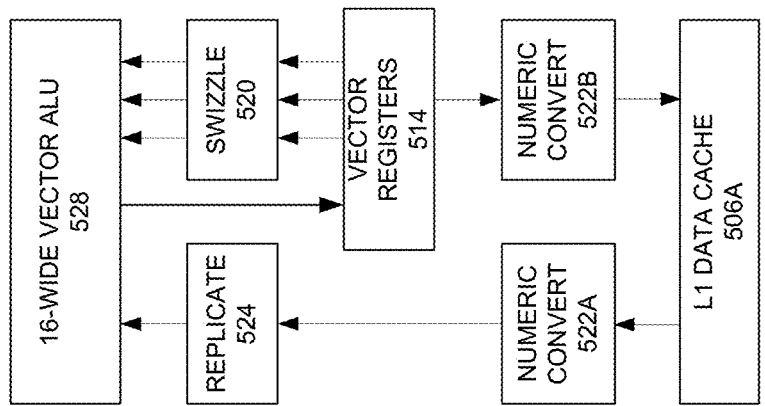
FIG. 5B illustrates an expanded view of part of the processor core in FIG. 5A according to embodiments of the invention.
Figure 5A:
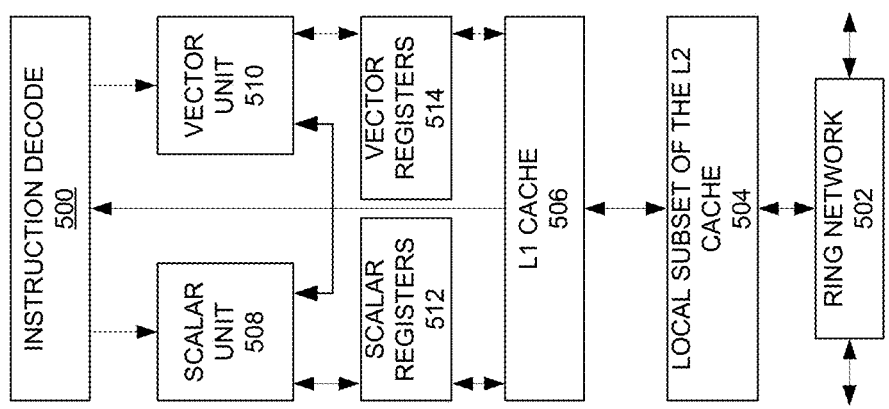
FIG. 5A is a block diagram of a single processor core, along with its connection to an on-die interconnect network.

FIGS. 5A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 5A is a block diagram of a single processor core, along with its connection to the on-die interconnect network 502 and with its local subset of the Level 2 (L2) cache 504, according to embodiments of the invention. In one embodiment, an instruction decoder 500 supports the x86 instruction set with a packed data instruction set extension. An L1 cache 506 allows low-latency accesses to cache memory into the scalar and vector units. While in one embodiment (to simplify the design), a scalar unit 508 and a vector unit 510 use separate register sets (respectively, scalar registers 512 and vector registers 514) and data transferred between them is written to memory and then read back in from a level 1 (L1) cache 506, alternative embodiments of the invention may use a different approach (e.g., use a single register set or include a communication path that allow data to be transferred between the two register files without being written and read back).

The local subset of the L2 cache 504 is part of a global L2 cache that is divided into separate local subsets, one per processor core. Each processor core has a direct access path to its own local subset of the L2 cache 504. Data read by a processor core is stored in its L2 cache subset 504 and can be accessed quickly, in parallel with other processor cores accessing their own local L2 cache subsets. Data written by a processor core is stored in its own L2 cache subset 504 and is flushed from other subsets, if necessary. The ring network ensures coherency for shared data. The ring network is bi-directional to allow agents such as processor cores, L2 caches and other logic blocks to communicate with each other within the chip. Each ring data-path is 1024-bits wide per direction in some embodiments.

FIG. 5B is an expanded view of part of the processor core in FIG. 5A according to embodiments of the invention. FIG. 5B includes an L1 data cache 506A part of the L1 cache 504, as well as more detail regarding the vector unit 510 and the vector registers 514. Specifically, the vector unit 510 is a 6-wide vector processing unit (VPU) (see the 16-wide ALU 528), which executes one or more of integer, single-precision float, and double-precision float instructions. The VPU supports swizzling the register inputs with swizzle unit 520, numeric conversion with numeric convert units 522A-B, and replication with replication unit 524 on the memory input.

Processor with Integrated Memory Controller and Graphics

Figure 6:
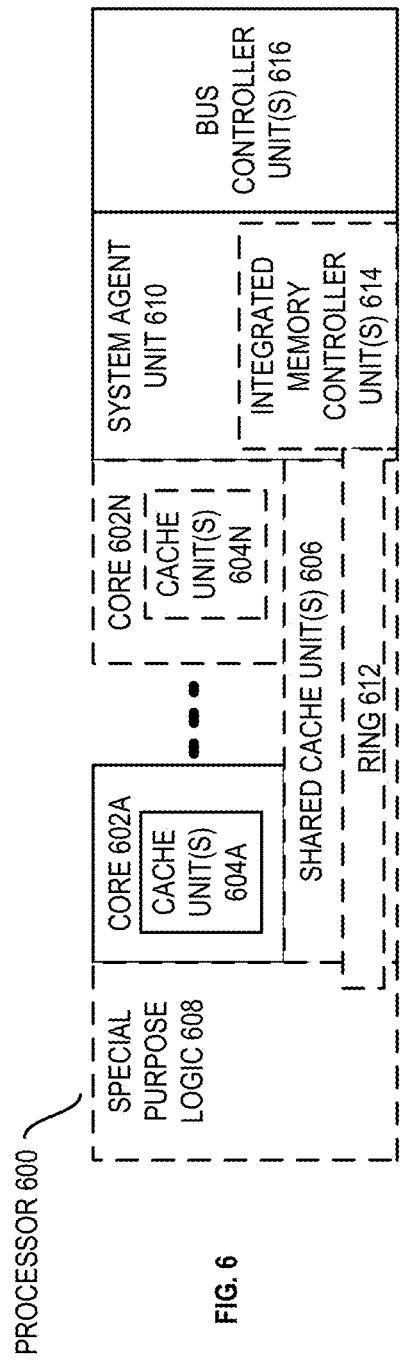
FIG. 6 is a block diagram of a single core processor and a multicore processor with integrated memory controller and graphics according to embodiments of the invention.

FIG. 6 is a block diagram of a processor 600 that may have more than one core, may have an integrated memory controller, and may have integrated graphics according to embodiments of the invention. The solid lined boxes in FIG. 6 illustrate a processor 600 with a single core 602A, a system agent 610, a set of one or more bus controller units 616, while the optional addition of the dashed lined boxes illustrates an alternative processor 600 with multiple cores 602A-N, a set of one or more integrated memory controller unit(s) 614 in the system agent unit 610, and special purpose logic 608.

Thus, different implementations of the processor 600 may include: 1) a CPU with the special purpose logic 608 being integrated graphics and/or scientific (throughput) logic (which may include one or more cores), and the cores 602A-N being one or more general purpose cores (e.g., general purpose in-order cores, general purpose out-of-order cores, a combination of the two); 2) a coprocessor with the cores 602A-N being a large number of special purpose cores intended primarily for graphics and/or scientific (throughput); and 3) a coprocessor with the cores 602A-N being a large number of general purpose in-order cores. Thus, the processor 600 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 600 may be a part of and/or may be implemented on one or more substrates using any of a number of process technologies, such as, for example, BiCMOS, CMOS, or NMOS.

The memory hierarchy includes one or more levels of cache within the cores 604A-N, a set or one or more shared cache units 606, and external memory (not shown) coupled to the set of integrated memory controller units 614. The set of shared cache units 606 may include one or more mid-level caches, such as level 2 (L2), level 3 (L3), level 4 (L4), or other levels of cache, a last level cache (LLC), and/or combinations thereof. While in one embodiment a ring based interconnect unit 612 interconnects the integrated graphics logic 608, the set of shared cache units 606, and the system agent unit 610/integrated memory controller unit(s) 614, alternative embodiments may use any number of well-known techniques for interconnecting such units. In one embodiment, coherency is maintained between one or more cache units 606 and cores 602-A-N.

In some embodiments, one or more of the cores 602A-N are capable of multi-threading. The system agent 610 includes those components coordinating and operating cores 602A-N. The system agent unit 610 may include for example a power control unit (PCU) and a display unit. The PCU may be or include logic and components needed for regulating the power state of the cores 602A-N and the integrated graphics logic 608. The display unit is for driving one or more externally connected displays.

The cores 602A-N may be homogenous or heterogeneous in terms of architecture instruction set; that is, two or more of the cores 602A-N may be capable of execution the same instruction set, while others may be capable of executing only a subset of that instruction set or a different instruction set.

Exemplary Computer Architectures

FIGS. 7-10 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 7:
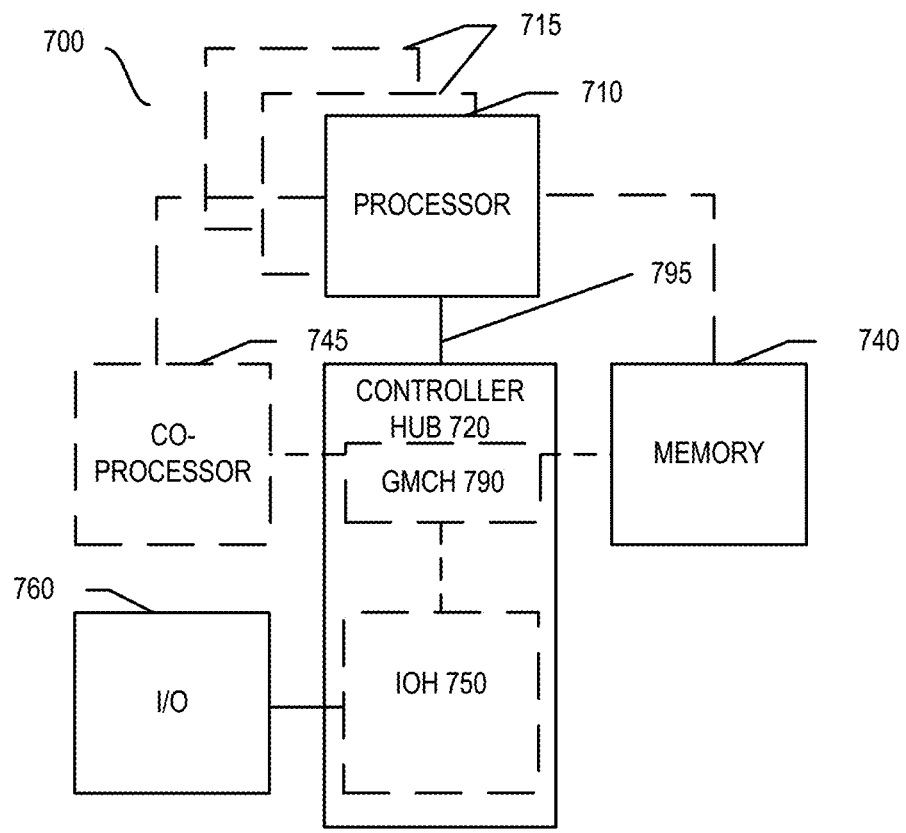
FIG. 7 illustrates a block diagram of a system in accordance with one embodiment of the present invention.

Referring now to FIG. 7, shown is a block diagram of a system 700 in accordance with one embodiment of the present invention. The system 700 may include one or more processors 710, 715, which are coupled to a controller hub 720. In one embodiment, the controller hub 720 includes a graphics memory controller hub (GMCH) 790 and an Input/Output Hub (IOH) 750 (which may be on separate chips); the GMCH 790 includes memory and graphics controllers to which are coupled memory 740 and a coprocessor 745; the IOH 750 is couples input/output (I/O) devices 760 to the GMCH 790. Alternatively, one or both of the memory and graphics controllers are integrated within the processor (as described herein), the memory 740 and the coprocessor 745 are coupled directly to the processor 710, and the controller hub 720 in a single chip with the IOH 750.

The optional nature of additional processors 715 is denoted in FIG. 7 with broken lines. Each processor 710, 715 may include one or more of the processing cores described herein and may be some version of the processor 600.

The memory 740 may be, for example, dynamic random access memory (DRAM), phase change memory (PCM), or a combination of the two. For at least one embodiment, the controller hub 720 communicates with the processor(s) 710, 715 via a multi-drop bus, such as a frontside bus (FSB), point-to-point interface, or similar connection 795.

In one embodiment, the coprocessor 745 is a special-purpose processor, such as, for example, a high-throughput MIC processor, a network or communication processor, compression engine, graphics processor, GPGPU, embedded processor, or the like. In one embodiment, controller hub 720 may include an integrated graphics accelerator.

There can be a variety of differences between the physical resources 710, 7155 in terms of a spectrum of metrics of merit including architectural, microarchitectural, thermal, power consumption characteristics, and the like.

In one embodiment, the processor 710 executes instructions that control data processing operations of a general type. Embedded within the instructions may be coprocessor instructions. The processor 710 recognizes these coprocessor instructions as being of a type that should be executed by the attached coprocessor 745. Accordingly, the processor 710 issues these coprocessor instructions (or control signals representing coprocessor instructions) on a coprocessor bus or other interconnect, to coprocessor 745. Coprocessor(s) 745 accept and execute the received coprocessor instructions.

Figure 8:
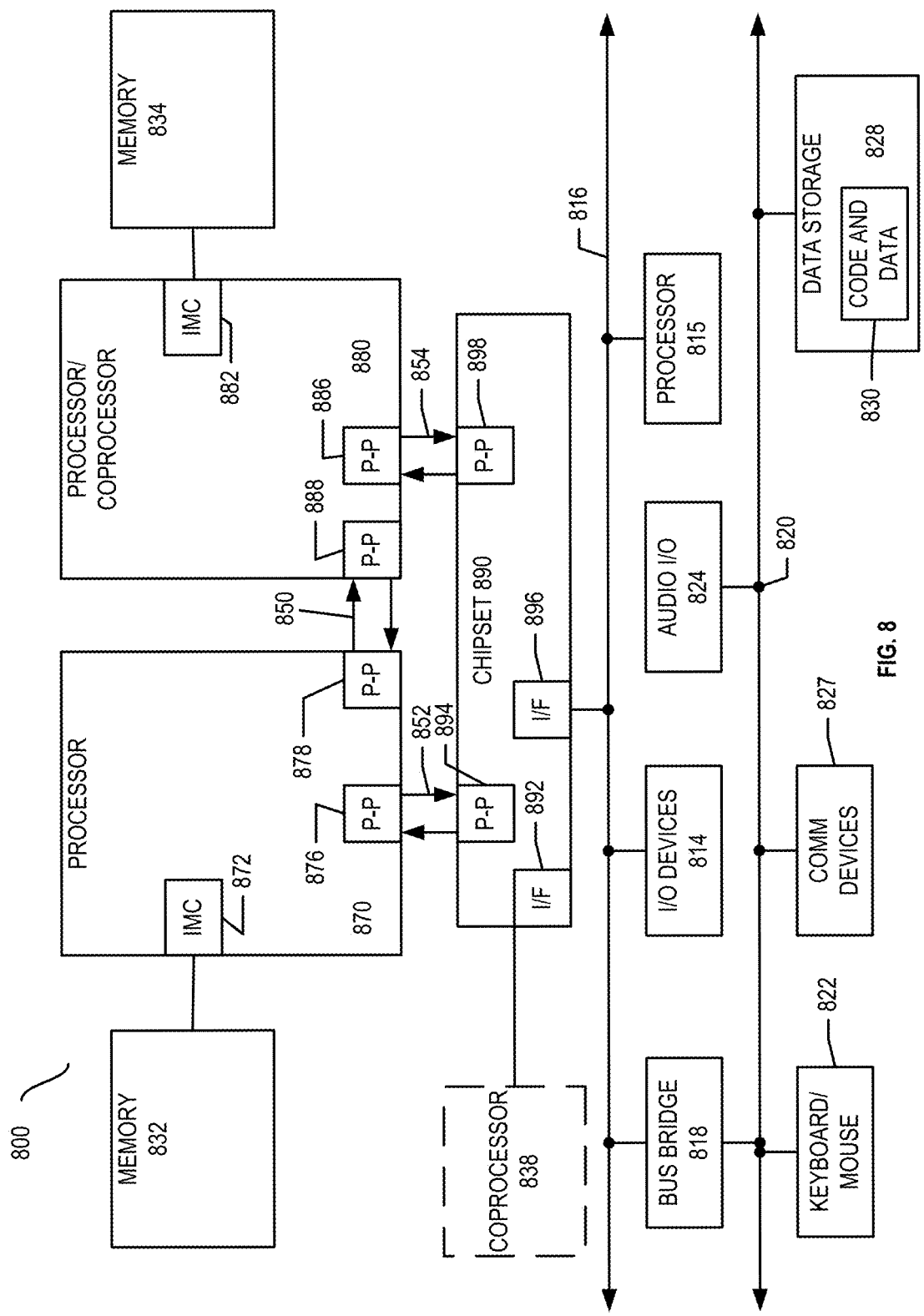
FIG. 8 illustrates a block diagram of a second system in accordance with an embodiment of the present invention.

Referring now to FIG. 8, shown is a block diagram of a first more specific exemplary system 800 in accordance with an embodiment of the present invention. As shown in FIG. 8, multiprocessor system 800 is a point-to-point interconnect system, and includes a first processor 870 and a second processor 880 coupled via a point-to-point interconnect 850. Each of processors 870 and 880 may be some version of the processor 600. In one embodiment of the invention, processors 870 and 880 are respectively processors 710 and 715, while coprocessor 838 is coprocessor 745. In another embodiment, processors 870 and 880 are respectively processor 710 coprocessor 745.

Processors 870 and 880 are shown including integrated memory controller (IMC) units 872 and 882, respectively. Processor 870 also includes as part of its bus controller units point-to-point (P-P) interfaces 876 and 878; similarly, second processor 880 includes P-P interfaces 886 and 888. Processors 870, 880 may exchange information via a point-to-point (P-P) interface 850 using P-P interface circuits 878, 888. As shown in FIG. 8, IMCs 872 and 882 couple the processors to respective memories, namely a memory 832 and a memory 834, which may be portions of main memory locally attached to the respective processors.

Processors 870, 880 may each exchange information with a chipset 890 via individual P-P interfaces 852, 854 using point to point interface circuits 876, 894, 886, 898. Chipset 890 may optionally exchange information with the coprocessor 838 via a high-performance interface 892. In one embodiment, the coprocessor 838 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 890 may be coupled to a first bus 816 via an interface 896. In one embodiment, first bus 816 may be a Peripheral Component Interconnect (PCI) bus, or a bus such as a PCI Express bus or another I/O interconnect bus, although the scope of the present invention is not so limited.

As shown in FIG. 8, various I/O devices 814 may be coupled to first bus 816, along with a bus bridge 818 which couples first bus 816 to a second bus 820. In one embodiment, one or more additional processor(s) 815, such as coprocessors, high-throughput MIC processors, GPGPU's, accelerators (such as, e.g., graphics accelerators or digital signal processing (DSP) units), field programmable gate arrays, or any other processor, are coupled to first bus 816. In one embodiment, second bus 820 may be a low pin count (LPC) bus. Various devices may be coupled to a second bus 820 including, for example, a keyboard and/or mouse 822, communication devices 827 and a storage unit 828 such as a disk drive or other mass storage device which may include instructions/code and data 830, in one embodiment. Further, an audio I/O 824 may be coupled to the second bus 816. Note that other architectures are possible. For example, instead of the point-to-point architecture of FIG. 8, a system may implement a multi-drop bus or other such architecture.

Figure 9:
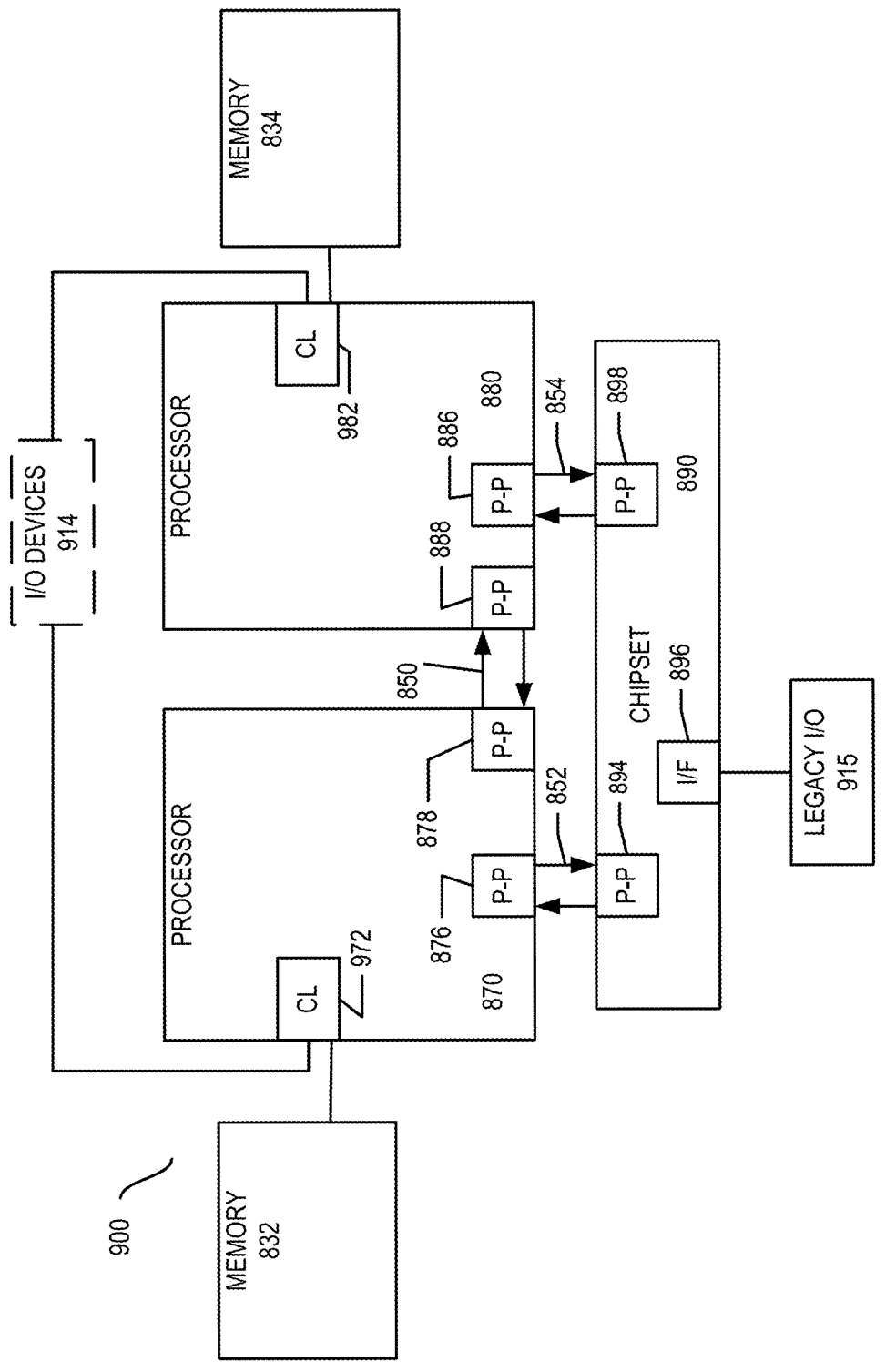
FIG. 9 illustrates a block diagram of a third system in accordance with an embodiment of the present invention.

Referring now to FIG. 9, shown is a block diagram of a second more specific exemplary system 900 in accordance with an embodiment of the present invention. Like elements in FIGS. 8 and 9 bear like reference numerals, and certain aspects of FIG. 8 have been omitted from FIG. 9 in order to avoid obscuring other aspects of FIG. 9.

FIG. 9 illustrates that the processors 870, 880 may include integrated memory and I/O control logic ("CL") 972 and 982, respectively. Thus, the CL 972, 982 include integrated memory controller units and include I/O control logic. FIG. 9 illustrates that not only are the memories 832, 834 coupled to the CL 872, 882, but also that I/O devices 914 are also coupled to the control logic 872, 882. Legacy I/O devices 915 are coupled to the chipset 890.

Figure 10:
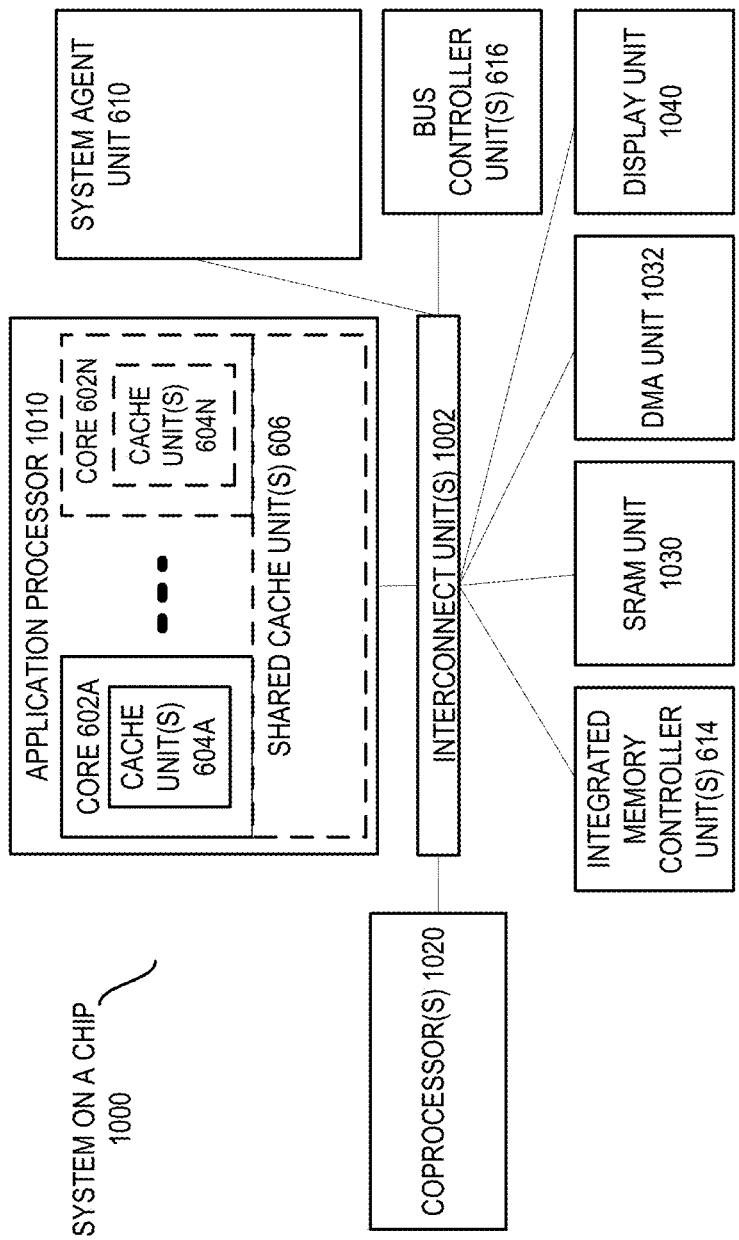
FIG. 10 illustrates a block diagram of a system on a chip (SoC) in accordance with an embodiment of the present invention.

Referring now to FIG. 10, shown is a block diagram of a SoC 1000 in accordance with an embodiment of the present invention. Similar elements in FIG. 6 bear like reference numerals. Also, dashed lined boxes are optional features on more advanced SoCs. In FIG. 10, an interconnect unit(s) 1002 is coupled to: an application processor 1010 which includes a set of one or more cores 102A-N, cache units 604A-N, and shared cache unit(s) 606; a system agent unit 610; a bus controller unit(s) 616; an integrated memory controller unit(s) 614; a set or one or more coprocessors 1020 which may include integrated graphics logic, an image processor, an audio processor, and a video processor; an static random access memory (SRAM) unit 1030; a direct memory access (DMA) unit 1032; and a display unit 1040 for coupling to one or more external displays. In one embodiment, the coprocessor(s) 1020 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 830 illustrated in FIG. 8, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 11:
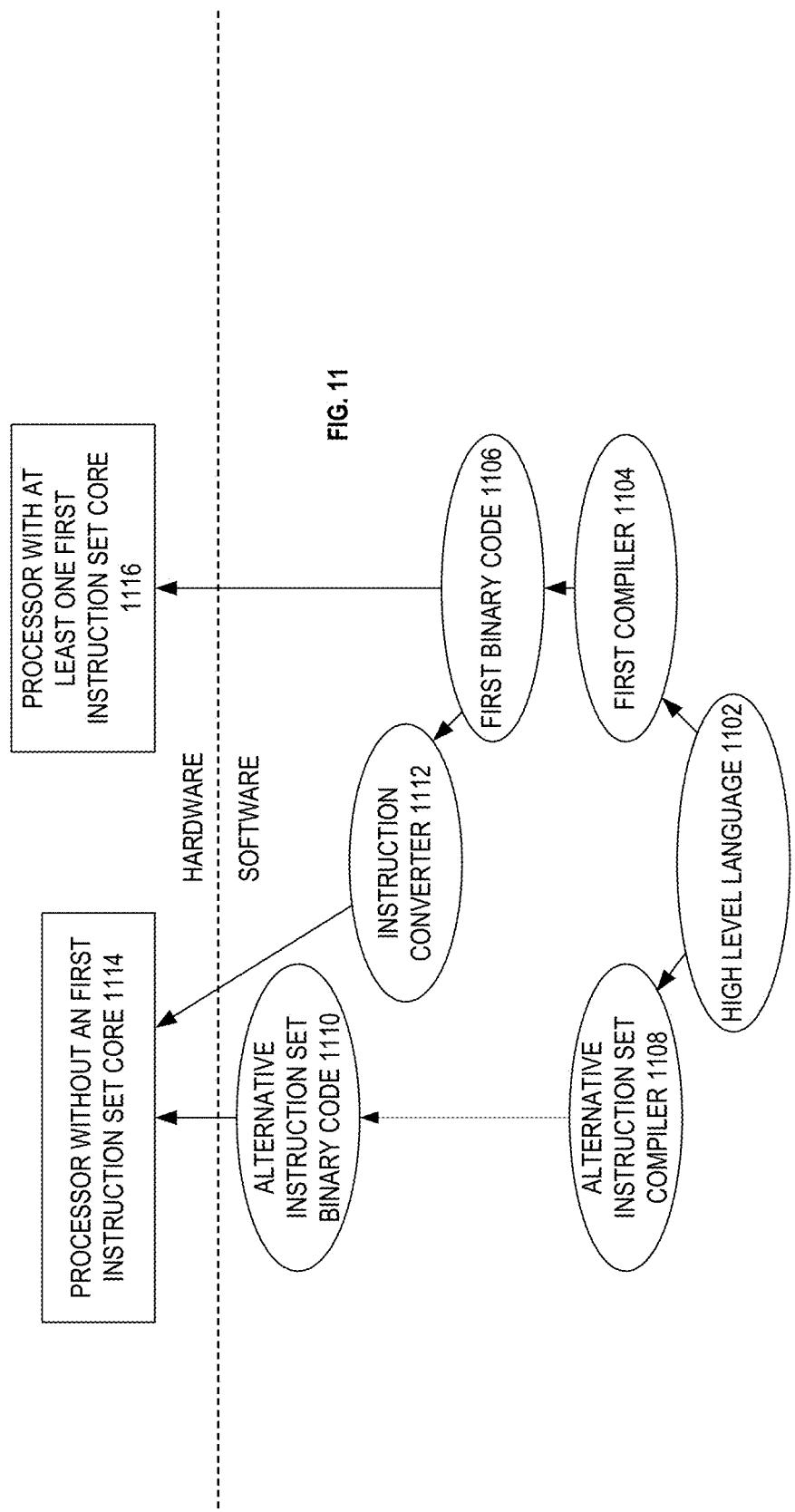
FIG. 11 illustrates a block diagram contrasting the use of a software instruction converter to convert binary instructions in a source instruction set to binary instructions in a target instruction set according to embodiments of the invention.

FIG. 11 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 11 shows a program in a high level language 1102 may be compiled using an first compiler 1104 to generate a first binary code (e.g., x86) 1106 that may be natively executed by a processor with at least one first instruction set core 1116. In some embodiments, the processor with at least one first instruction set core 1116 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The first compiler 1104 represents a compiler that is operable to generate binary code of the first instruction set 1106 (e.g., object code) that can, with or without additional linkage processing, be executed on the processor with at least one first instruction set core 1116. Similarly, FIG. 11 shows the program in the high level language 1102 may be compiled using an alternative instruction set compiler 1108 to generate alternative instruction set binary code 1110 that may be natively executed by a processor without at least one first instruction set core 1114 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1112 is used to convert the first binary code 1106 into code that may be natively executed by the processor without an first instruction set core 1114. This converted code is not likely to be the same as the alternative instruction set binary code 1110 because an instruction converter capable of this is difficult to make; however, the converted code will accomplish the general operation and be made up of instructions from the alternative instruction set. Thus, the instruction converter 1112 represents software, firmware, hardware, or a combination thereof that, through emulation, simulation or any other process, allows a processor or other electronic device that does not have a first instruction set processor or core to execute the first binary code 1106.

Apparatus and Method for Digital Signal Processing Instructions

Digital signal processing (DSP) instructions are described below. In one embodiment, the circuitry and logic to perform the DSP operations is integrated within the execution engine unit 450 shown in FIG. 4B, within the various cores described above (see, e.g., cores 602A-N in FIGS. 6 and 10), and/or within the vector unit 510 shown in FIG. 5A. For example, the various source and destination registers may be SIMD registers within the physical register file unit(s) 458 in FIG. 4B and/or vector registers 310 in FIG. 3. The multiplication circuits, adder circuits, accumulation circuits, and other circuitry described below may be integrated within the execution components of the architectures described above including, by way of example and not limitation, the execution unit(s) 462 in FIG. 4B. It should be noted, however, that the underlying principles of the invention are not limited to these specific architectures.

One embodiment of the invention includes circuitry and/or logic for processing digital signal processing (DSP) instructions. In particular, one embodiment comprises a multiply-accumulate (MAC) architecture with eight 16×16-bit multipliers and two 64-bit accumulators. The instruction set architecture (ISA) described below can process various multiply and MAC operations on 128-bit packed (8-bit, 16-bit or 32-bit data elements) integer, fixed point and complex data types. In addition, certain instructions have direct support for highly efficient Fast Fourier Transform (FFT) and Finite Impulse Response (FIR) filtering, and post-processing of accumulated data by shift, round, and saturate operations.

One embodiment of the new DSP instructions use a VEX.128 prefix based opcode encoding and several of the SSE/SSE2/AVX instructions that handle post-processing of data are used with the DSP ISA. The VEX-encoded 128-bit DSP instructions with memory operands may have relaxed memory alignment requirements.

In one embodiment, the instructions also support a variety of integer and fixed point data types including:
1) a Q31 data type for signals requiring analog to digital conversion (ADC) and digital to analog conversion (DAC) with greater than 16 bits;
2) a Q15 data type which is common in DSP algorithms;
3) a complex 16-bit data type; and
4) a complex 32-bit data type.

The instruction set architecture described herein targets a wide range of standard DSP (e.g., FFT, filtering, pattern matching, correlation, polynomial evaluation, etc) and statistical operations (e.g., mean, moving average, variance, etc.).

Target applications of the embodiments of the invention include sensor, audio, classification tasks for computer vision, and speech recognition. The DSP ISA described herein includes a wide range of instructions that are applicable to deep neural networks (DNN), automatic speech recognition (ASR), sensor fusion with Kalman filtering, other major DSP applications, etc. Given the sequence of weights $\{w_1, w_2, \ldots w_k\}$ and the input sequence $\{x_1, x_2, x_3, \ldots x_n\}$ many image processing, machine learning tasks require to compute the result sequence $\{y_1, y_2, y_3, \ldots y_{n+1-k}\}$ defined by $y_i = w_1 x_i + w_2 x_{i+1} + \ldots + w_k x_{i+k-1}$.

Figure 12:
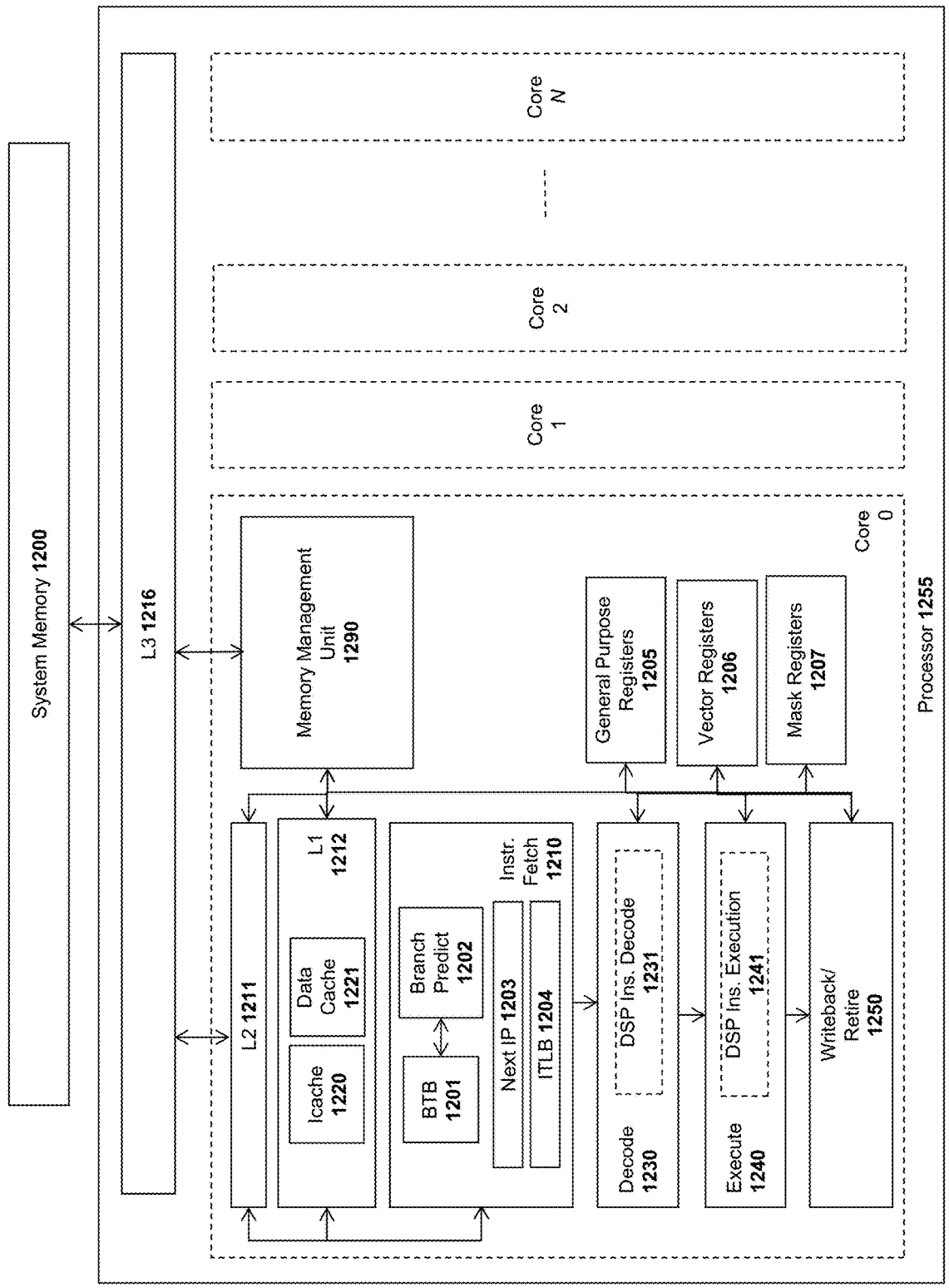
FIG. 12 illustrates a processor architecture on which embodiments of the invention may be implemented.

FIG. 12 illustrates an exemplary processor 1255 on which embodiments of the invention may be implemented which includes a plurality of cores 0-N for simultaneously executing a plurality of instruction threads. The illustrated embodiment includes DSP instruction decode circuitry/logic 1231 within the decoder 1230 and DSP instruction execution circuitry/logic 1341 within the execution unit 1240. These pipeline components may perform the operations described herein responsive to the decoding and execution of the DSP instructions. While details of only a single core (Core 0) are shown in FIG. 12, it will be understood that each of the other cores of processor 1255 may include similar components.

Prior to describing specific details of the embodiments of the invention, a description of the various components of the exemplary processor 1255 are provided directly below. The plurality of cores 0-N may each include a memory management unit 1290 for performing memory operations (e.g., such as load/store operations), a set of general purpose registers (GPRs) 1205, a set of vector registers 1206, and a set of mask registers 1207. In one embodiment, multiple vector data elements are packed into each vector register 1206 which may have a 512 bit width for storing two 256 bit values, four 128 bit values, eight 64 bit values, sixteen 32 bit values, etc. However, the underlying principles of the invention are not limited to any particular size/type of vector data. In one embodiment, the mask registers 1207 include eight 64-bit operand mask registers used for performing bit masking operations on the values stored in the vector registers 1206 (e.g., implemented as mask registers k0-k7 described herein). However, the underlying principles of the invention are not limited to any particular mask register size/type.

Each core 0-N may include a dedicated Level 1 (L1) cache 1212 and Level 2 (L2) cache 1211 for caching instructions and data according to a specified cache management policy. The L1 cache 1212 includes a separate instruction cache 1220 for storing instructions and a separate data cache 1221 for storing data. The instructions and data stored within the various processor caches are managed at the granularity of cache lines which may be a fixed size (e.g., 64, 128, 512 Bytes in length). Each core of this exemplary embodiment has an instruction fetch unit 1210 for fetching instructions from main memory 1200 and/or a shared Level 3 (L3) cache 1216. The instruction fetch unit 1210 includes various well known components including a next instruction pointer 1203 for storing the address of the next instruction to be fetched from memory 1200 (or one of the caches); an instruction translation look-aside buffer (ITLB) 1204 for storing a map of recently used virtual-to-physical instruction addresses to improve the speed of address translation; a branch prediction unit 1202 for speculatively predicting instruction branch addresses; and branch target buffers (BTBs) 1201 for storing branch addresses and target addresses.

As mentioned, a decode unit 1230 includes DSP instruction decode circuitry/logic 1231 for decoding the DSP instructions described herein into micro-operations or "uops" and the execution unit 1240 includes DSP instruction execution circuitry/logic 1241 for executing the DSP instructions. A writeback/retirement unit 1250 retires the executed instructions and writes back the results.

Embodiments for Performing Dual Signed and Unsigned Multiplications of Packed Data Elements One embodiment of the invention includes a first instruction for performing a vector packed dual unsigned multiplication operation. In particular, execution of the first instruction multiplies a first packed unsigned doubleword (32-bits) selected from a packed quadword in a first source register and a second packed signed doubleword selected from another packed quadword in a second source register. In one embodiment, the 64 bit unsigned result is written into each of two quadwords (64 bits) of the destination register, which may be a 128 bit register. One embodiment of the first instruction is represented as VPMULUDHHQ xmm0, xmm1, xmm2/m128, where xmm1 and xmm2 are the two source registers and xmm0 is the destination register.

One embodiment includes a second instruction for performing a vector packed dual signed multiplication operation. Execution of the second instruction multiplies a first packed signed doubleword (32-bits) selected from a packed quadword in a first source register and a second packed signed doubleword selected from a packed quadword in a second source register. In one implementation, the 64 bit signed result is written into each of two quadwords (64 bits) of the destination register, which may be a 128 bit register. One embodiment of the first instruction is represented as VPMULDHHQ xmm0, xmm1, xmm2/m128, where xmm1 and xmm2 are the two source registers and xmm0 is the destination register.

FIG. 13 illustrates exemplary data element and bit distributions for an exemplary source register and/or destination register (SRCx/DESTx). Data elements may be packed into the source register and/or destination register in words (16 bits), doublewords (32 bits), and/or quadwords (64 bits) as illustrated. In some embodiments which process complex numbers, the real and imaginary components may be stored in adjacent data element locations. For example, a real component may be stored as data element A and the corresponding imaginary component may be stored as data element B. However, in other embodiments described herein, such as the 32×32 packed doubleword multiplication instructions, the packed data elements B-A, D-C, F-E, and H-G do not represent complex numbers.

Figure 14A:
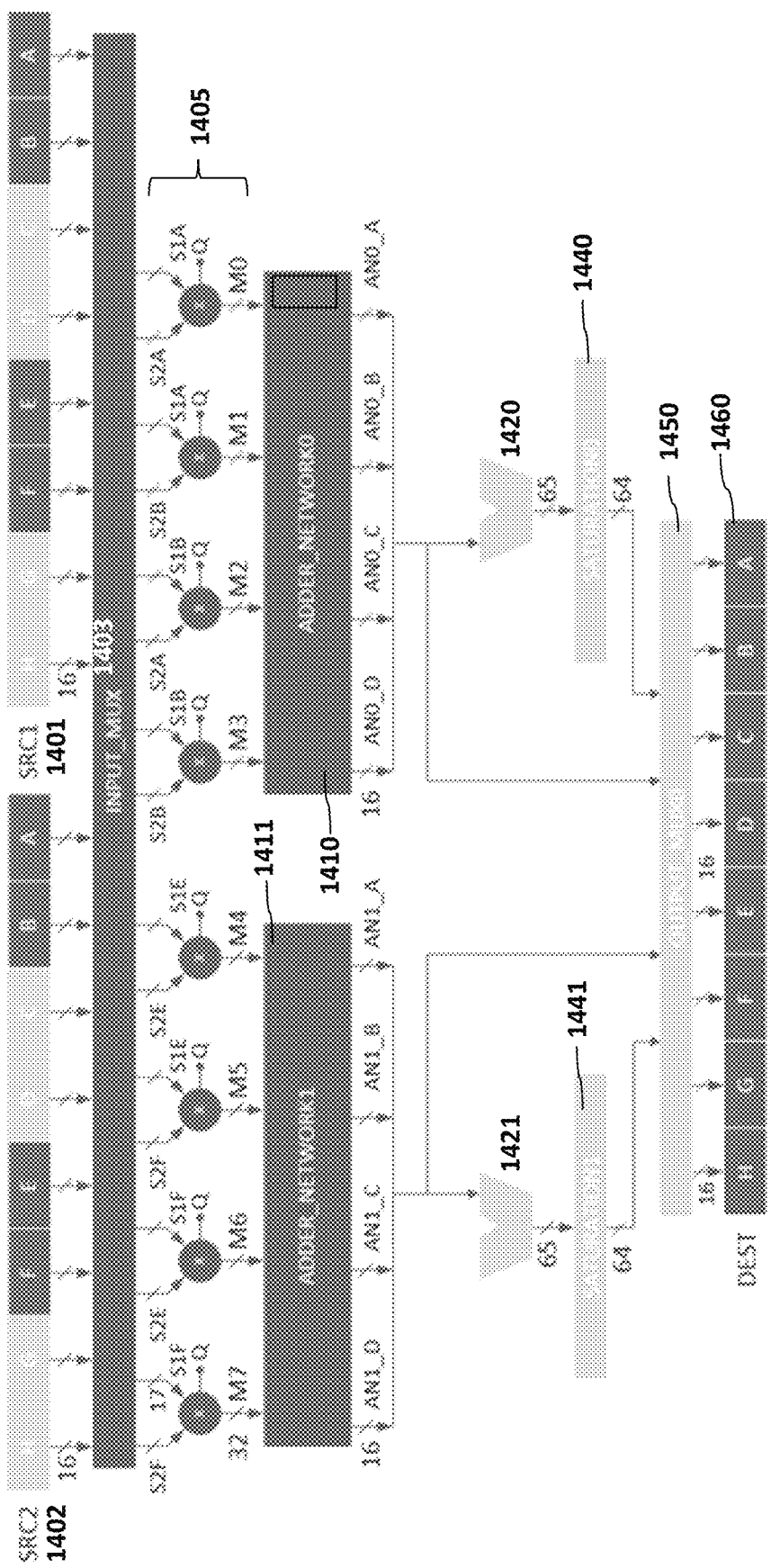
FIGS. 14A-B illustrates embodiments of a packed data processing architecture.

FIG. 14A illustrates an exemplary architecture for executing the packed multiplication instructions. As mentioned, these instructions may use two packed source data operands stored in registers SRC1 1401, and SRC2 1402 in FIG. 14A. In the illustrated embodiment, SRC1 1401 stores doubleword data elements B-A and F-E and source register SRC2 1402 stores doubleword data elements B-A and F-E.

Note that in some embodiments, certain components shown in FIG. 14A such as the accumulators 1420-1421 and saturation circuits 1440-1441 are not needed to perform the described operations. In such cases, it is assumed that data is simply passed through these circuits without modification.

In one embodiment, multipliers 1405 concurrently perform multiplications of two doublewords. For example, first and second doublewords from the upper portion of each quadword in SRC1 (e.g., SRC1[63:32] and SRC1[127:96]) are multiplied by corresponding first and second doublewords from the upper portion of each quadword in SRC2 (e.g., SRC2[63:32] and SRC2[127:96]). The 64 bit results of the multiplications are then stored in each quadword of the 128 bit destination. For example, the result of the multiplication SRC1[63:32]*SRC2[63:32] may be stored in DEST [63:0] while the result of the multiplication SRC1[127:96] *SRC2[127:96] may be stored in DEST[127:64]. This may be represented as:

DEST[63:0]←SRC1[63:32]*SRC2[63:32];

DEST[127:64]←SRC1[127:96]*SRC2[127:96];

As mentioned, one instruction may be executed to perform an unsigned multiplication in which the source values SRC1[63:32], SRC2[63:32], SRC1[127:96], and SRC2[127: 96] and the resulting data elements DEST[63:0] and DEST [127:64], are unsigned. Another instruction may be executed to perform a signed multiplication in which the source values and resulting data elements are signed. For example, VPMULUDHHQ may perform the unsigned multiplications while VPMULDHHQ may perform the signed multiplications.

In one embodiment, the shift operations described below may be implemented on the quadword results stored in the destination register. For example, the results may be right-shifted or left-shifted and a most significant portion of the shifted result may be stored to a least significant portion of a destination register. In addition, saturation and/or routing may be performed to generate a final result.

Figure 15:
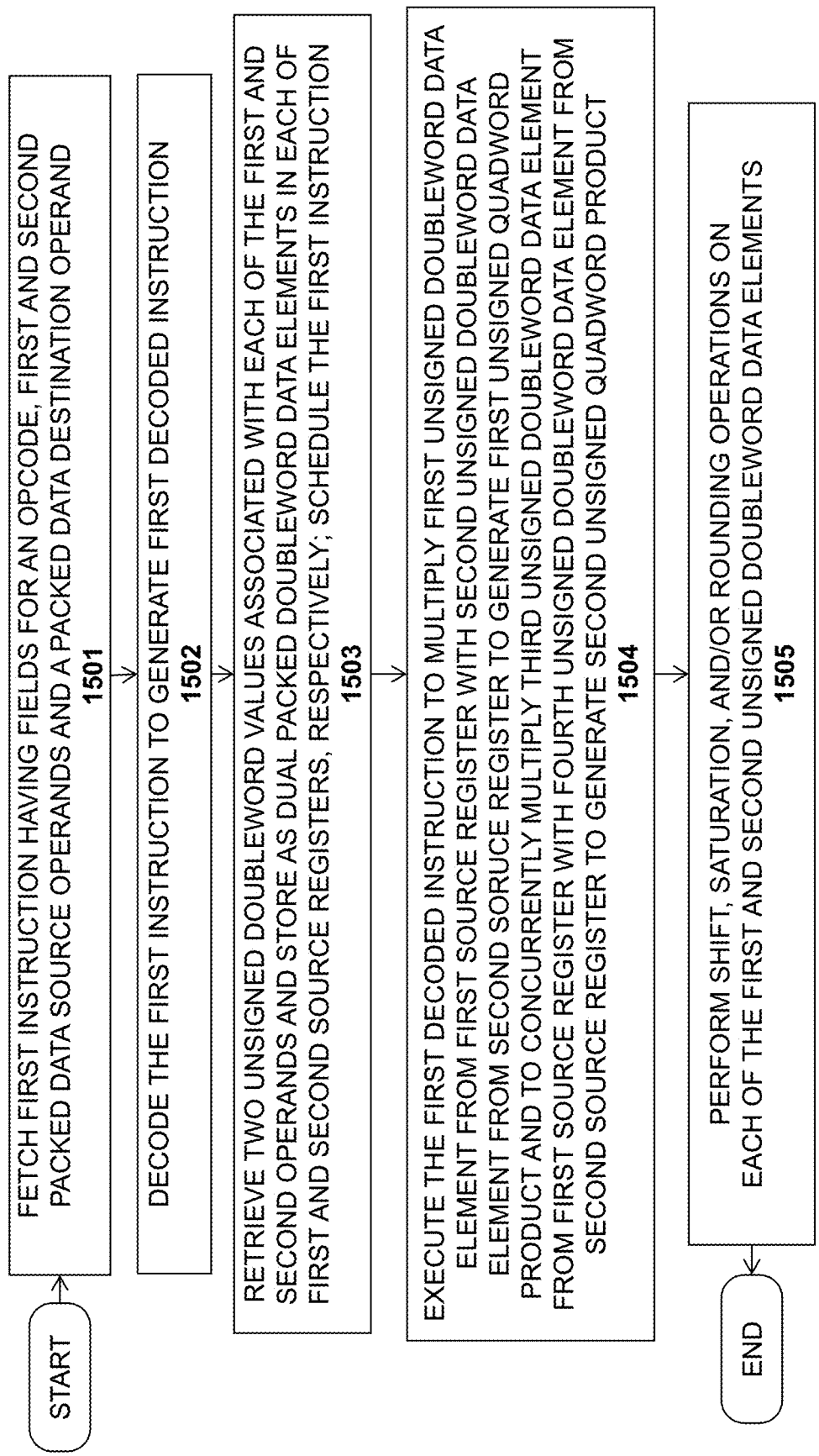
FIG. 15 illustrates a method in accordance with one embodiment of the invention.

A method in accordance with one embodiment of the invention is illustrated in FIG. 15. The method may be implemented within the context of the processor and system architectures described above but is not limited to any particular system architecture.

At 1501, a first instruction is fetched having fields for an opcode and first and second packed data source operands and a packed data destination operand. At 1502 the first instruction is decoded to generate a first decoded instruction (e.g., into a plurality of microoperations). At 1503, two unsigned doubleword values associated with each of the first and second operands are retrieved and stored as dual packed doubleword data elements in each of the first and second source registers, respectively. As mentioned, in one embodiment, the source operands are stored in 128-bit packed data registers with packed doubleword (32-bit) data elements.

At 1504 the first decoded instruction is executed to multiply a first unsigned doubleword data element from the first source register with a second unsigned doubleword data element from a second source register to generate a first unsigned quadword product and to concurrently multiply a third unsigned doubleword data element from the first source register with a fourth unsigned doubleword data element from the second source register to generate a second unsigned quadword product.

At 1505, the shift operations described herein may be performed on the first and second quadword results. For example, the results may be right-shifted or left-shifted and a most significant portion of the shifted result may be stored to a least significant portion of a destination register. In addition, saturation and/or routing may be performed to generate the final result.

Figure 16:
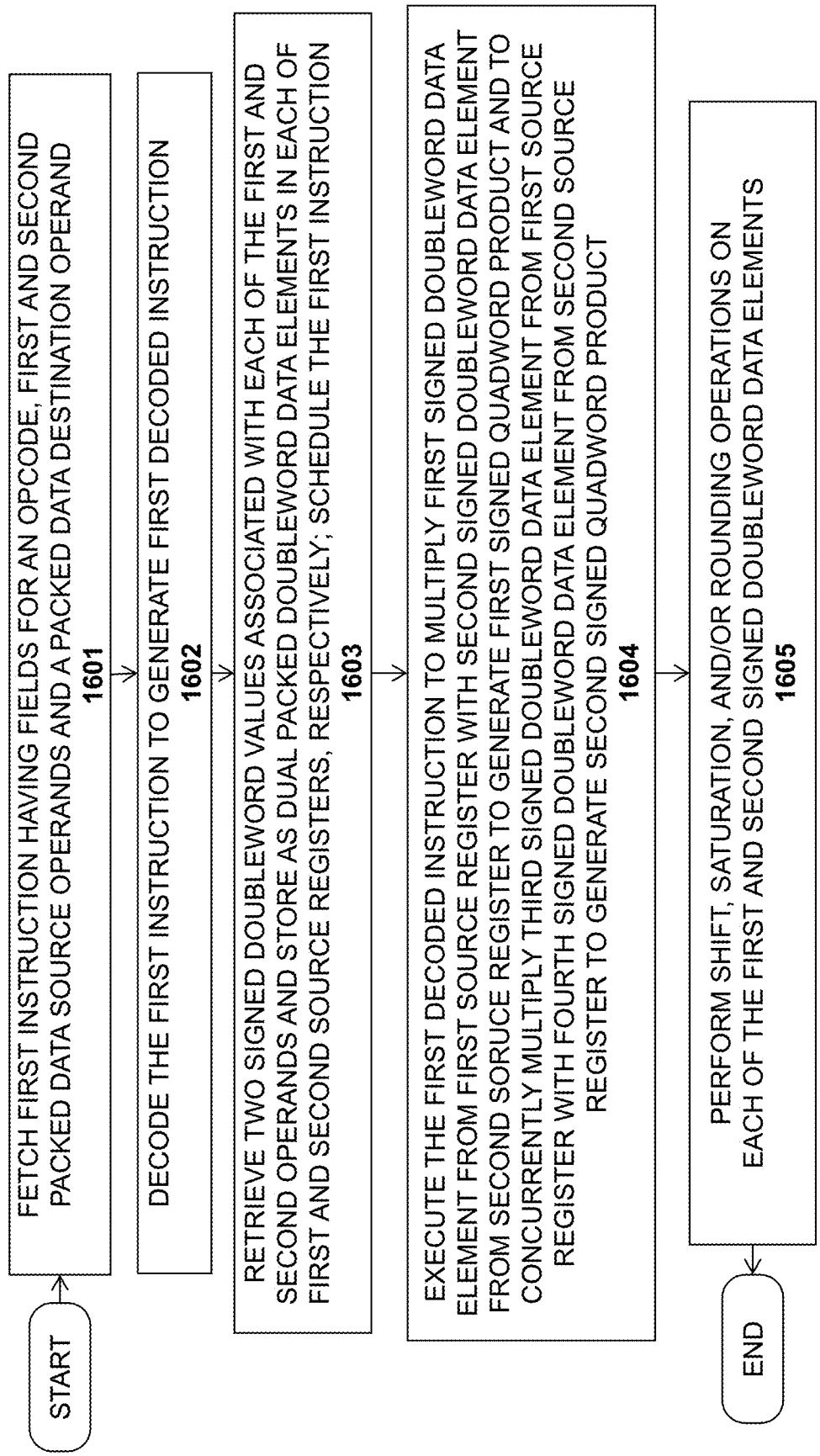
FIG. 16 illustrates a method in accordance with another embodiment of the invention.

A method in accordance with one embodiment of the invention is illustrated in FIG. 16. The method may be implemented within the context of the processor and system architectures described above but is not limited to any particular system architecture.

At 1601, a first instruction is fetched having fields for an opcode and first and second packed data source operands and a packed data destination operand. At 1602 the first instruction is decoded to generate a first decoded instruction (e.g., into a plurality of microoperations). At 1603, two signed doubleword values associated with each of the first and second operands are retrieved and stored as dual packed doubleword data elements in each of the first and second source registers, respectively. As mentioned, in one embodiment, the source operands are stored in 128-bit packed data registers with packed doubleword (32-bit) data elements.

At 1604 the first decoded instruction is executed to multiply a first signed doubleword data element from the first source register with a second signed doubleword data element from a second source register to generate a first signed quadword product and to concurrently multiply a third signed doubleword data element from the first source register with a fourth signed doubleword data element from the second source register to generate a second signed quadword product.

At 1605, the shift operations described herein may be performed on the first and second quadword results. For example, the results may be right-shifted or left-shifted and a most significant portion of the shifted result may be stored to a least significant portion of a destination register. In addition, saturation and/or routing may be performed to generate the final result.

Shifting Data Elements and Extracting Data

One embodiment of the invention includes instructions which perform various right shift and left shift operations of bits in each of a plurality of unsigned aligned quadwords (e.g., such as the results of the above-described unsigned multiplications). For example, in one embodiment, a quadword is shifted right in a first packed data register or memory location (e.g., xmm2/m128), with a 6-bit count specified in imm8[5:0]. The most significant 16-bits [63:48] of each of the shifted quadwords is written into the [15:0] bits of the corresponding quadword in the destination register (e.g., xmm1). In one embodiment, a logical right shift of the bits in each of the aligned unsigned quadwords is performed in a first source register (e.g., xmm2), with a 6-bit count specified in a second source register or memory location (e.g., xmm3/m128[5:0], xmm3/m128[69:64]). The most significant 16-bits [63:48] of each of the shifted quadwords is written into bits [15:0] of the corresponding quadword in the destination register (e.g., xmm1). In one embodiment, 0's are shifted into the most significant bits during the right shift for each of the aligned unsigned quadwords.

The upper word result may be extracted from each of the right-shifted quadwords with the arithmetic flags being unaffected. The shifted upper 16-bits from each of the quadwords may be rounded based on rounding control and saturated to a word. If saturation occurs, a saturation flag may be set (e.g., in the MXCSR status register).

One embodiment also includes an instruction to perform a logical shift left of the bits in each unsigned quadword. For example, logical left shift the bits in each of the aligned unsigned quadwords of a source register or memory location (e.g., xmm1/m128), with 6-bit count specified in imm8[5:0]. The most significant 16-bits [63:48] of each of the shifted quadwords, gets written into the [15:0] bits of the corresponding quadword in the destination register (e.g., xmm1). One embodiment performs a logical left shift of the bits in each of the aligned unsigned quadwords of a first source register (e.g., xmm2), with 6-bit count specified in a second source register or memory location (e.g., xmm3/m128[5:0], xmm3/m128[69:64]). The most significant 16-bits [63:48] of each of the shifted quadwords is written into bits the [15:0] of the corresponding quadword in the destination register (e.g., xmm1).

One embodiment shifts 0's into the least significant bits (LSBs) during the left shift for each of the aligned unsigned quadwords. This embodiment extracts the upper word result from each of the left shifted quadwords without affecting the arithmetic flags. The shifted upper 16-bits from each of the quadwords are rounded based on the rounding control and saturated to doublewords. If saturation occurs, the saturation flag may be set in a status/control register (e.g., the MXCSR status register).

The shift operations described herein may be performed in response to the execution of a single instruction. These may include VPSRLRSDUQ and VPSRLVRSDUQ which perform logical shift right of packed quadwords by an amount based on an immediate and source operand, respectively. In addition, shift left instructions include VPSLLRSDUQ and VPSLLVRSDUQ which perform logical shift left of packed quadwords by an amount based on an immediate and source operand, respectively.

Figure 17:
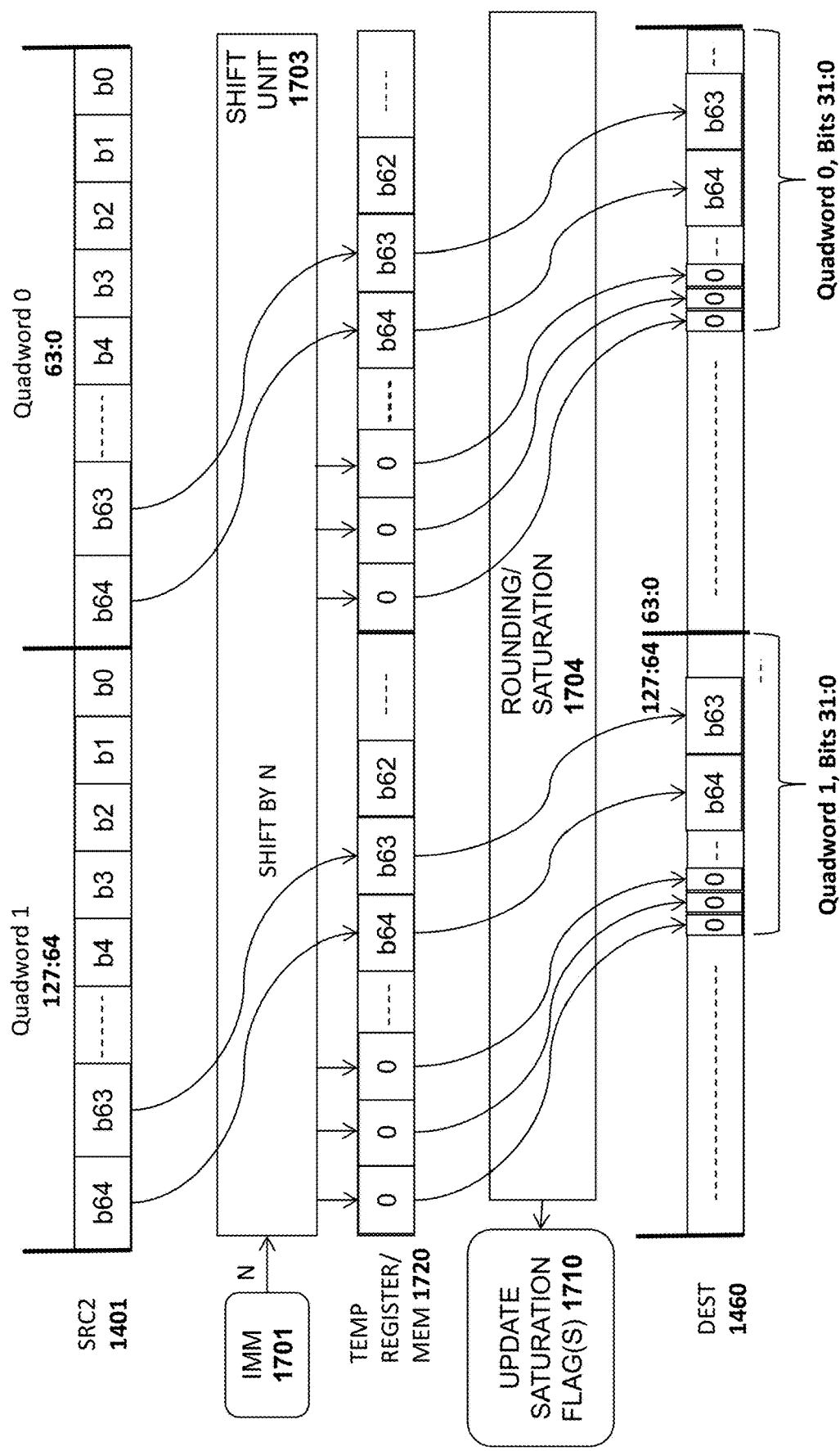
FIG. 17 illustrates one embodiment for right-shifting multiple data elements based on an immediate and writing a specified portion to a destination.

One embodiment of an architecture for right-shifting packed quadwords by an amount based on an immediate and writing the most significant 32 bits of the resulting quadword to the lower 32 bits of the destination is illustrated in FIG. 17. In particular, two quadwords are illustrated in SRC2 1401, identified as quadword 0 (stored at bits 63:0) and quadword 1 (stored at bits 127:64). In response to a value included in the immediate 1701 (e.g., imm8[5:0]), a shift unit 1703 shifts the values in each quadword to the right by N bits, storing the results in a temporary register or memory location 1720. Given that 6 immediate bits are used in this embodiment to identify a shift amount, N can have a range of values between 0 and 64 (i.e., $2^6=64$). In the particular example shown in FIG. 17, bits b64 and b63 are shown being shifted by a value of N which is between 0 and 64. In one embodiment, the shift unit 1703 inserts zeroes in the bit positions from which the values are shifted. Thus, the most significant bit positions occupied by b64, b63, and b62 are filled with zeroes in the illustrated example.

In one embodiment, following the shift operation the 32 most significant bits of each shifted quadword are written to the least significant 32 bits of the destination register 1460. In the illustrated example, bits b64 and b63 are included in the most significant bits. It should be noted, however, that this will not always be the case. For example, if the value of N is 32 or greater, then bit b64 will be shifted out of range of the most significant 32 bits, which will be filled in with all zeroes. When this happens all zeroes are written to the least significant bit positions in the destination register 1460.

As mentioned, in one embodiment, the 32 bit result may be extracted from each of the right-shifted quadwords without affecting the arithmetic flags in the processor. In addition, the shifted upper 32-bits from each of the quadwords may be rounded based on rounding control and saturated to a word, if necessary. If saturation occurs, a saturation flag 1710 may be set (e.g., in the MXCSR status register). Rounding/saturation circuitry 1704 may perform rounding and/or saturation operations on the value written to the least significant bit positions of each quadword.

In one embodiment, the shift unit 1703 is integrated within the adder networks 1410-1411 in FIG. 14A and rounding/saturation circuitry 1704 is integrated in the saturation circuitry 1440-1440. Alternatively, the shift unit 1703 and rounding circuitry may be implemented as separate circuitry/logic from the architectural components shown in FIG. 14A.

Figure 18:
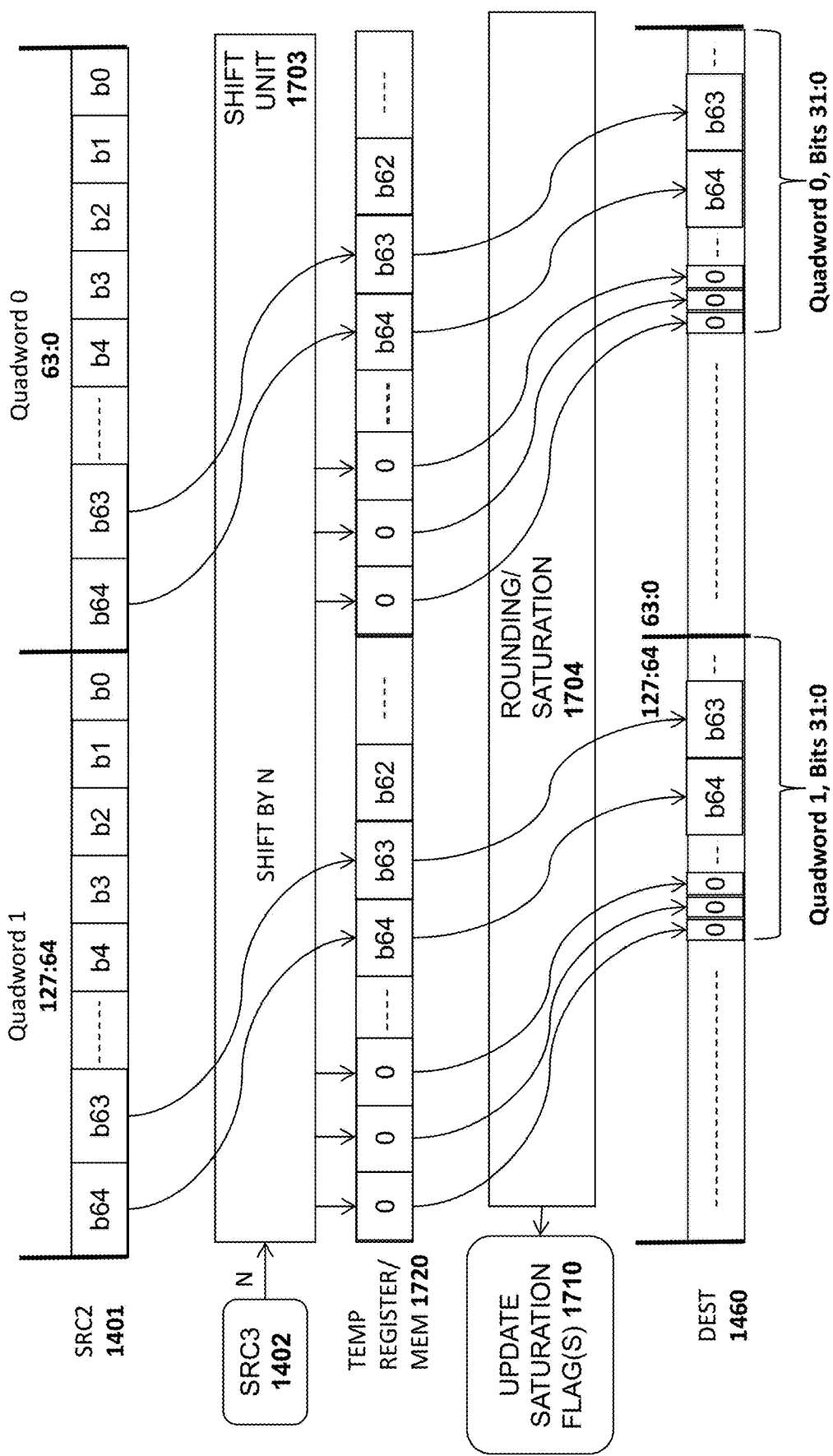
FIG. 18 illustrates one embodiment for right-shifting multiple data elements based on a source value and writing a specified portion to a destination.

FIG. 18 illustrates one embodiment in which the shift value (N), specifying the amount by which the shift unit 1703 is to right-shift the two quadwords, is specified in another source register, such as SRC3 1402. The 6 bit value may be stored in the least significant or most significant positions of a packed data element such as a packed byte or packed word, with the bits outside of the 6 bits being set to zero or ignored. In one embodiment, the operation of the shift unit 1703 is otherwise substantially the same as described above with respect to FIG. 17.

Figure 19:
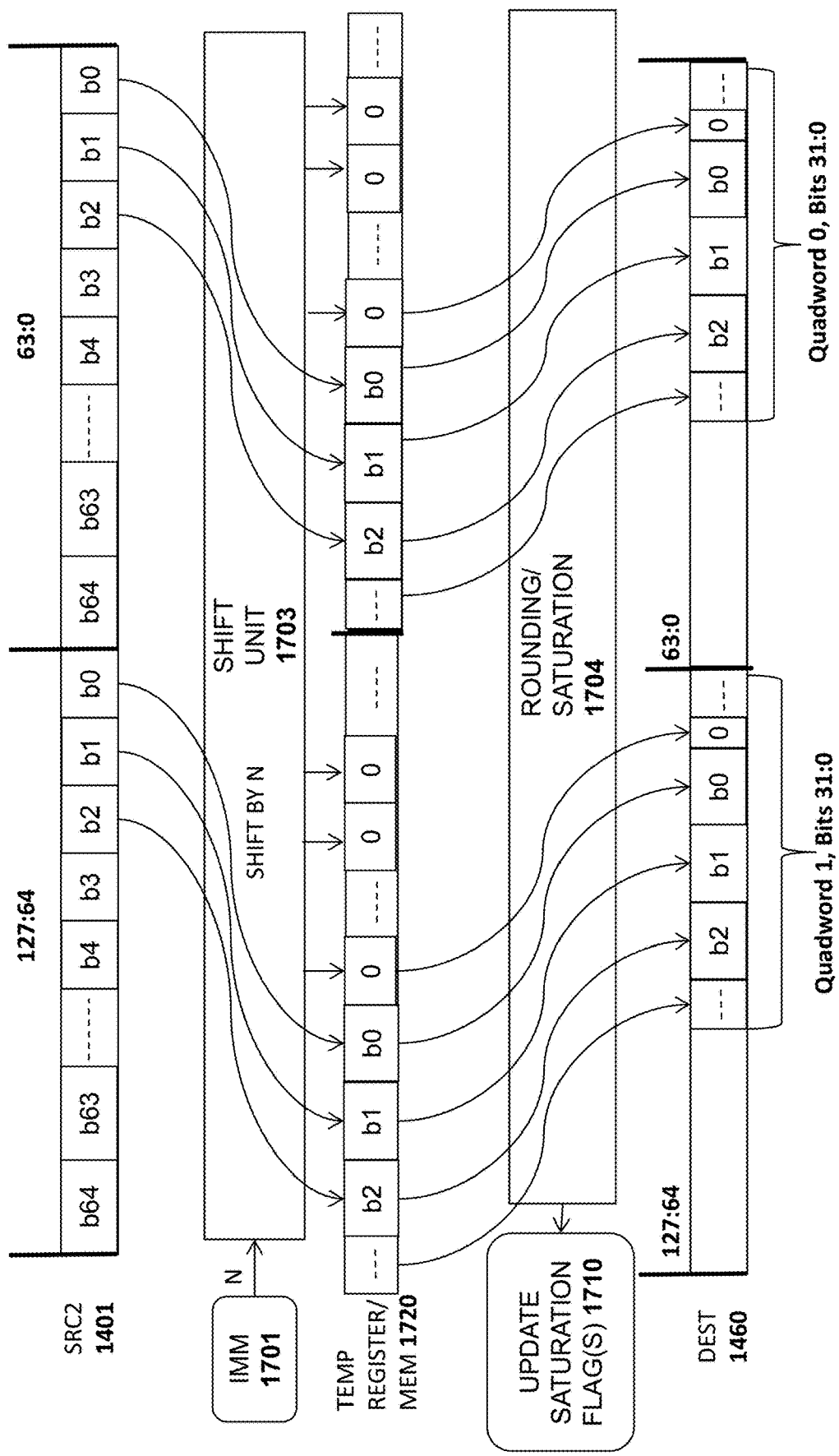
FIG. 19 illustrates one embodiment for left-shifting multiple data elements based on an immediate and writing a specified portion to a destination.

One embodiment of an architecture for left-shifting packed quadwords based on an immediate value and writing the most significant 32 bits of the resulting quadword to the lower 32 bits of the destination is illustrated in FIG. 19. In particular, two quadwords are illustrated in SRC1 1401, identified as quadword 0 (stored at bits 63:0) and quadword 1 (stored at bits 127:64). In response to a value included in the immediate 1701 (e.g., imm8[5:0]), a shift unit 1703 shifts the values in each quadword to the left by N bits, storing the results in a temporary register or memory location 1720. Given that 6 immediate bits are used in this embodiment to identify a shift amount, N can have a range of values between 0 and 64 (i.e., $2^6=64$). In the particular example shown in FIG. 19, bits b0, b1, and b2 are shown being shifted by a value of N which is between 0 and 64. In one embodiment, the shift unit 1703 inserts zeroes in the bit positions from which the quadword bit values are shifted. Thus, the least significant bit positions occupied by b0, b1, and b2 are filled with zeroes in the illustrated example.

In one embodiment, following the shift operation, the 32 most significant bits of each shifted quadword are written to the least significant 32 bits of the destination register 1460. In the illustrated example, bits b2, b1, and b0 are included in the most significant bits. It should be noted, however, that this will not always be the case. For example, if the value of N is less than 32, then bit b0 will be in the lower 32 bits of the resulting quadword (i.e., it will not be included in the most significant 32 bits). Similarly, if N is 64, then the shifted quadword is filled with all zeroes, which will be written to the least significant bit positions in the destination register 1460.

As mentioned, in one embodiment, the 32 bit result may be extracted from each of the left-shifted quadwords without affecting the arithmetic flags in the processor. In addition, the shifted upper 32-bits from each of the quadwords may be rounded based on rounding control and saturated to a word, if necessary. If saturation occurs, a saturation flag 1710 may be set (e.g., in the MXCSR status register). Rounding/saturation circuitry 1704 may perform rounding and/or saturation operations on the value written to the least significant bit positions of each quadword.

Figure 20:
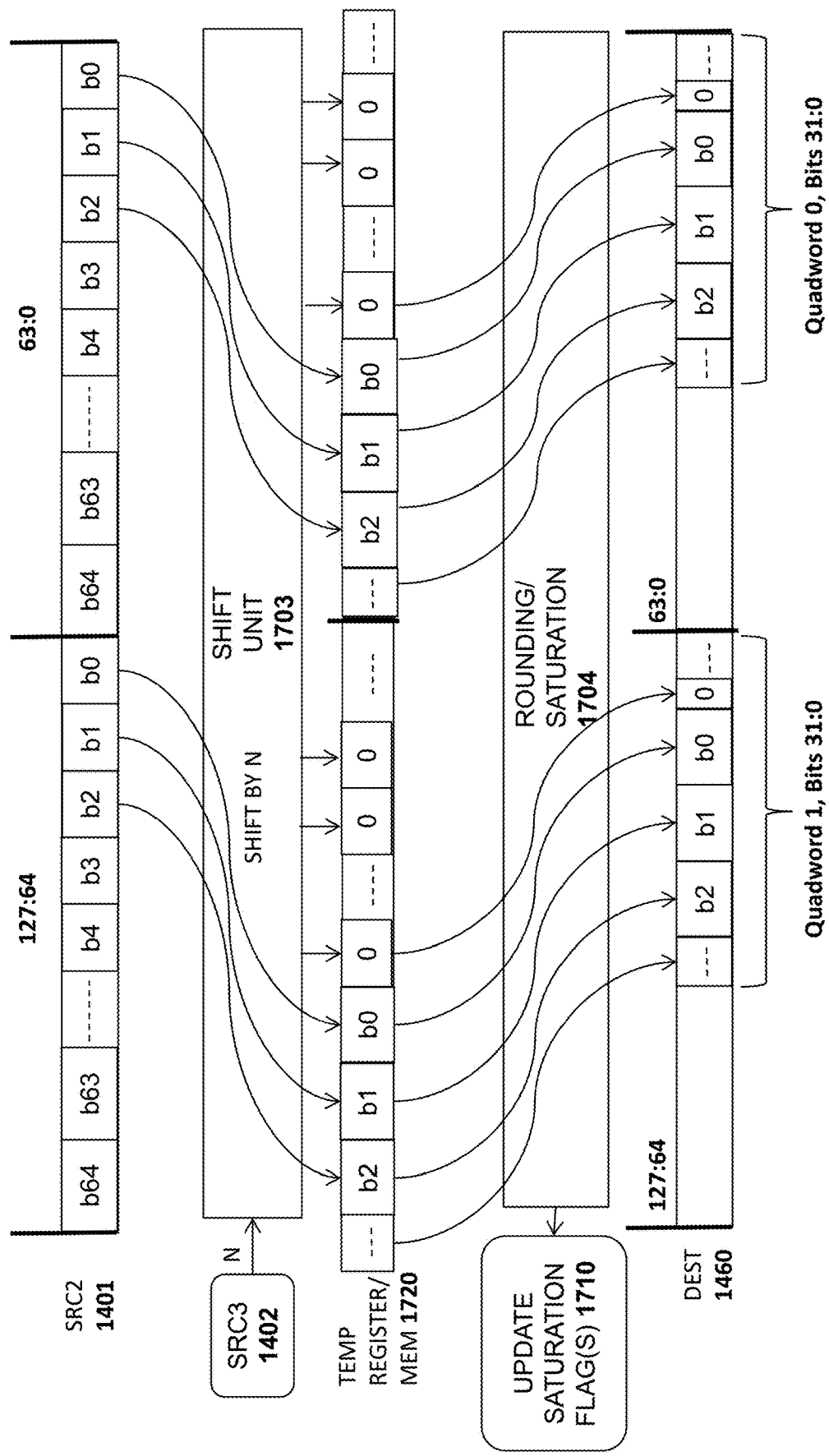
FIG. 20 illustrates one embodiment for left-shifting multiple data elements based on a source value and writing a specified portion to a destination.

FIG. 20 illustrates one embodiment in which the shift value (N), specifying the amount by which the shift unit 1703 is to right-shift the two quadwords, is specified in another source register, such as SRC2 1402. The 6 bit value may be stored in the least significant or most significant positions of a packed data element such as a packed byte or packed word, with the bits outside of the 6 bits being set to zero or ignored. In one embodiment, the operation of the shift unit 1703 is otherwise substantially the same as described above with respect to FIG. 17.

Vector Packed Multiply Signed/Unsigned Byte With Accumulate

One embodiment of the invention includes a first instruction for performing a vector packed unsigned byte multiplication operation followed by accumulation with existing doubleword values. In particular, execution of the first instruction multiplies 16 packed unsigned bytes from a first source register with 16 corresponding packed unsigned bytes from a second source register to generate 16 unsigned products. Four sets of the 16 unsigned products are accumulated to generate four temporary results. The four temporary results are then accumulated with unsigned doubleword values from a destination register and the result is stored back to the destination register. In one embodiment, the four temporary results are zero extended prior to performing the accumulation. One embodiment of the first instruction is represented as VPDPBUUD xmm1, xmm2, xmm3/m128, where xmm1, xmm2, and xmm3 are source registers and xmm3 is the destination register.

One embodiment of the invention includes a second instruction for performing a vector packed signed byte multiplication operation followed by accumulation with existing doubleword values. In particular, execution of the first instruction multiplies 16 packed signed bytes from a first source register with 16 corresponding packed signed bytes from a second source register to generate 16 signed products. Four sets of the 16 signed products are accumulated to generate four temporary results. The four temporary results are then accumulated with signed doubleword values from a destination register and the result is stored back to the destination register. In one embodiment, the four temporary results are zero extended prior to performing the accumulation. One embodiment of the first instruction is represented as VPDPBSSD xmm1, xmm2, xmm3/m128, where xmm1, xmm2, and xmm3 are source registers and xmm3 is also a destination register.

Figure 14B:
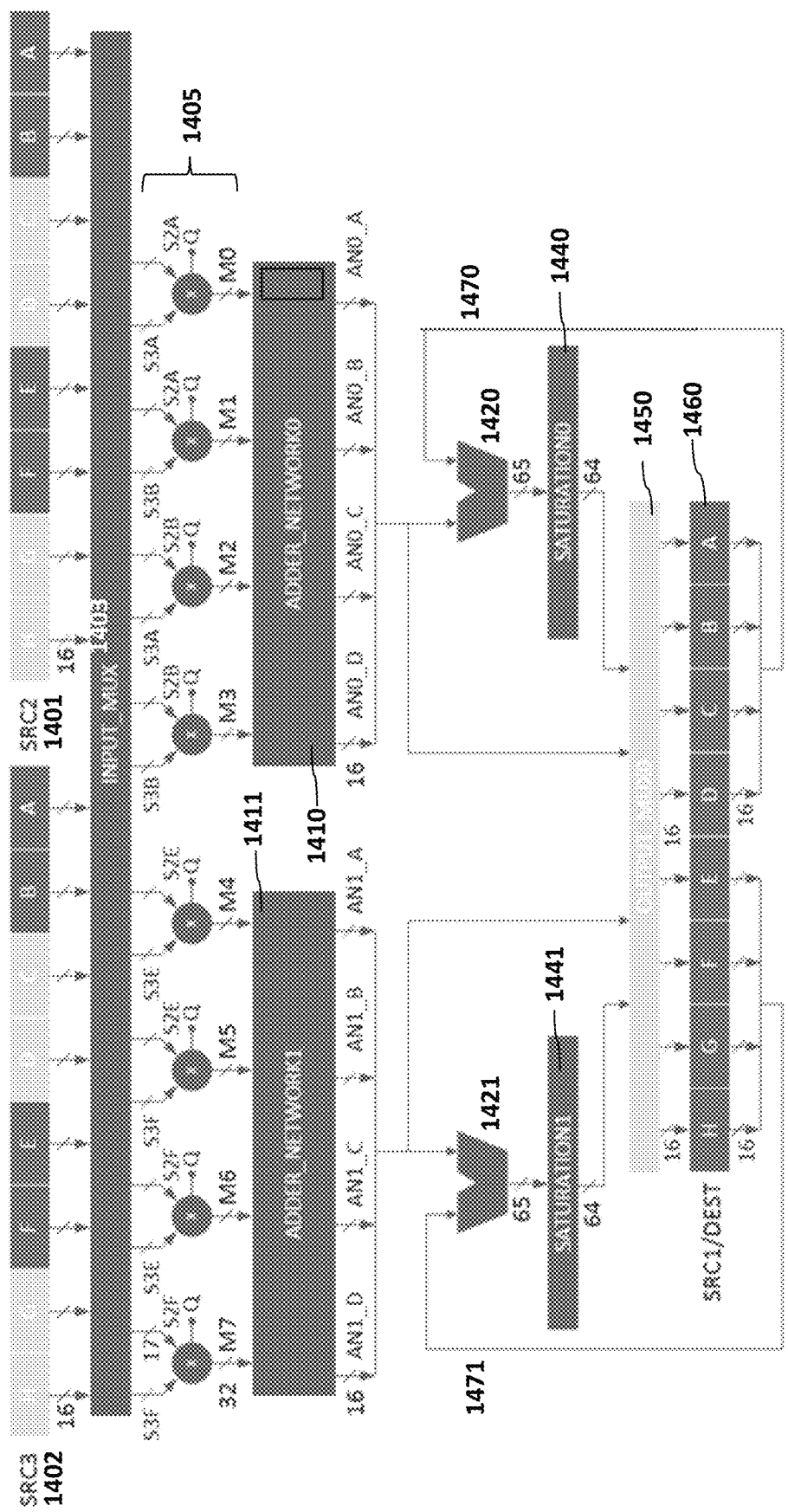

FIG. 14B illustrates many of the same components as FIG. 14A, with one difference being that the outputs of the destination register 1460 operate as the third source register for the accumulation operations described herein, as indicated by data lines 1470-1471. In one embodiment, the multipliers 1405 concurrently perform the 16 unsigned/signed byte multiplications by multiplying each byte in SRC1 1401 with a corresponding byte in SRC2 1402 to generate the 16 unsigned/signed products. In one embodiment, adder networks 1410-1411 then add four sets of four unsigned/signed products to generate four temporary results which may be stored in temporary registers or memory locations. Each of the four temporary results are then zero extended and added to a corresponding 32-bit data element from the destination register 1460 to generate final results. The final results are then written back to the corresponding data element locations in the destination register.

In one embodiment, the vector packed unsigned multiply and accumulate is represented as:

TEMP0[17:0]←((SRC2[31:24]*SRC3[31:24])+
(SRC2[23:16]*SRC3[23:16])+(SRC2[15:8]*
SRC3[15:8])+(SRC2[7:0]*SRC3[7:0]));

TEMP1[17:0]←((SRC2[63:56]*SRC3[63:56])+
(SRC2[55:48]*SRC3[55:48])+(SRC2[47:40]*
SRC3[47:40])+(SRC2[39:32]*SRC3[39:32]));

TEMP2[17:0]←((SRC2[95:88]*SRC3[95:88])+
(SRC2[87:80]*SRC3[87:80])+(SRC2[79:72]*
SRC3[79:72])+(SRC2[71:64]*SRC3[71:64]));

TEMP3[17:0]←((SRC2[127:120]*SRC3[127:120])+
(SRC2[119:112]*SRC3[119:112])+(SRC2[111:
104]*SRC3[111:104])+(SRC2[103:96]*SRC3
[103:96]));

DEST[31:0]←AddToDword({14'b0,TEMP0[17:0]},
DEST[31:0]);

DEST[63:32]←AddToDword({14'b0,TEMP1[17:0]},
DEST[63:32]);

DEST[95:64]←AddToDword({14'b0,TEMP2[17:0]},
DEST[95:64]);

DEST[127:96]←AddToDword({14'b0,TEMP3[17:0]},
DEST[127:96]);

In the above code, the multipliers 1405 perform the above multiplications to generate the above products. Adder network 1410 adds the products SRC2[31:24]*SRC3[31:24], SRC2[23:16]*SRC3[23:16], SRC2[15:8]*SRC3[15:8], and SRC2[7:0]*SRC3[7:0], storing the 17-bit result in TEMP0 and also adds the products SRC2[63:56]*SRC3[63:56], SRC2[55:48]*SRC3[55:48], SRC2[47:40]*SRC3[47:40], and SRC2[39:32]*SRC3[39:32], storing the 17-bit result in TEMP1.

Similarly, adder network 1411 adds the products SRC2[95:88]*SRC3[95:88], SRC2[87:80]*SRC3[87:80], SRC2[79:72]*SRC3[79:72], SRC2[71:64]*SRC3[71:64], storing the 17-bit result in TEMP2 and also adds SRC2[127:120]*SRC3[127:120], SRC2[119:112]*SRC3[119:112], SRC2[111:104]*SRC3[111:104], SRC2[103:96]*SRC3[103:96], storing the 17-bit result in TEMP3.

The AddToDword operations then zero-extend each of the 17 bit results to 32 bits and adds each resulting 32-bit value to one of the four doublewords stored in the destination register. The final results are then stored back to the corresponding doubleword location in the destination register.

In one embodiment, the vector packed signed multiply and accumulate is represented as:

TEMP0[17:0]←((SRC2[31:24]*SRC3[31:24])+
(SRC2[23:16]*SRC3[23:16])+(SRC2[15:8]*
SRC3[15:8])+(SRC2[7:0]*SRC3[7:0]));

TEMP1[17:0]←((SRC2[63:56]*SRC3[63:56])+
(SRC2[55:48]*SRC3[55:48])+(SRC2[47:40]*
SRC3[47:40])+(SRC2[39:32]*SRC3[39:32]));

TEMP2[17:0]←((SRC2[95:88]*SRC3[95:88])+
(SRC2[87:80]*SRC3[87:80])+(SRC2[79:72]*
SRC3[79:72])+(SRC2[71:64]*SRC3[71:64]));

TEMP3[17:0]←((SRC2[127:120]*SRC3[127:120])+
(SRC2[119:112]*SRC3[119:112])+(SRC2[111:
104]*SRC3[111:104])+(SRC2[103:96]*SRC3
[103:96]));

DEST[31:0]←AddToDword({14{TEMP0[17]},
TEMP0[17:0]},DEST[31:0]);

DEST[63:32]←AddToDword({14{TEMP1[17]},
TEMP1[17:0]},DEST[63:32]);

DEST[95:64]←AddToDword({14{TEMP2[17]},
TEMP2[17:0]},DEST[95:64]);

DEST[127:96]←AddToDword({14{TEMP3[17]},
TEMP3[17:0]},DEST[127:96]);

In the above code, the multipliers 1405 perform the above multiplications to generate the above products. Adder network 1410 adds the products SRC2[31:24]*SRC3[31:24], SRC2[23:16]*SRC3[23:16], SRC2[15:8]*SRC3[15:8], and SRC2[7:0]*SRC3[7:0], storing the 17-bit result in TEMP0 and also adds the products SRC2[63:56]*SRC3[63:56], SRC2[55:48]*SRC3[55:48], SRC2[47:40]*SRC3[47:40], and SRC2[39:32]*SRC3[39:32], storing the 17-bit result in TEMP1.

Similarly, adder network 1411 adds the products SRC2[95:88]*SRC3[95:88], SRC2[87:80]*SRC3[87:80], SRC2[79:72]*SRC3[79:72], SRC2[71:64]*SRC3[71:64], storing the 17-bit result in TEMP2 and also adds SRC2[127:120]*SRC3[127:120], SRC2[119:112]*SRC3[119:112], SRC2[111:104]*SRC3[111:104], SRC2[103:96]*SRC3[103:96], storing the 17-bit result in TEMP3.

The AddToDword operations then sign-extend each of the 17 bit results to 32 bits and adds each resulting 32-bit value to one of the four doublewords stored in the destination register. The final results are then stored back to the corresponding doubleword location in the destination register.

In one embodiment, the shift, rounding, and saturation operations described herein may be implemented on the doubleword results stored in the destination register. For example, the results may be right-shifted or left-shifted and a most significant portion of the shifted result may be stored to a least significant portion of a destination register. In addition, saturation and/or routing may be performed to generate a final result.

Figure 21:
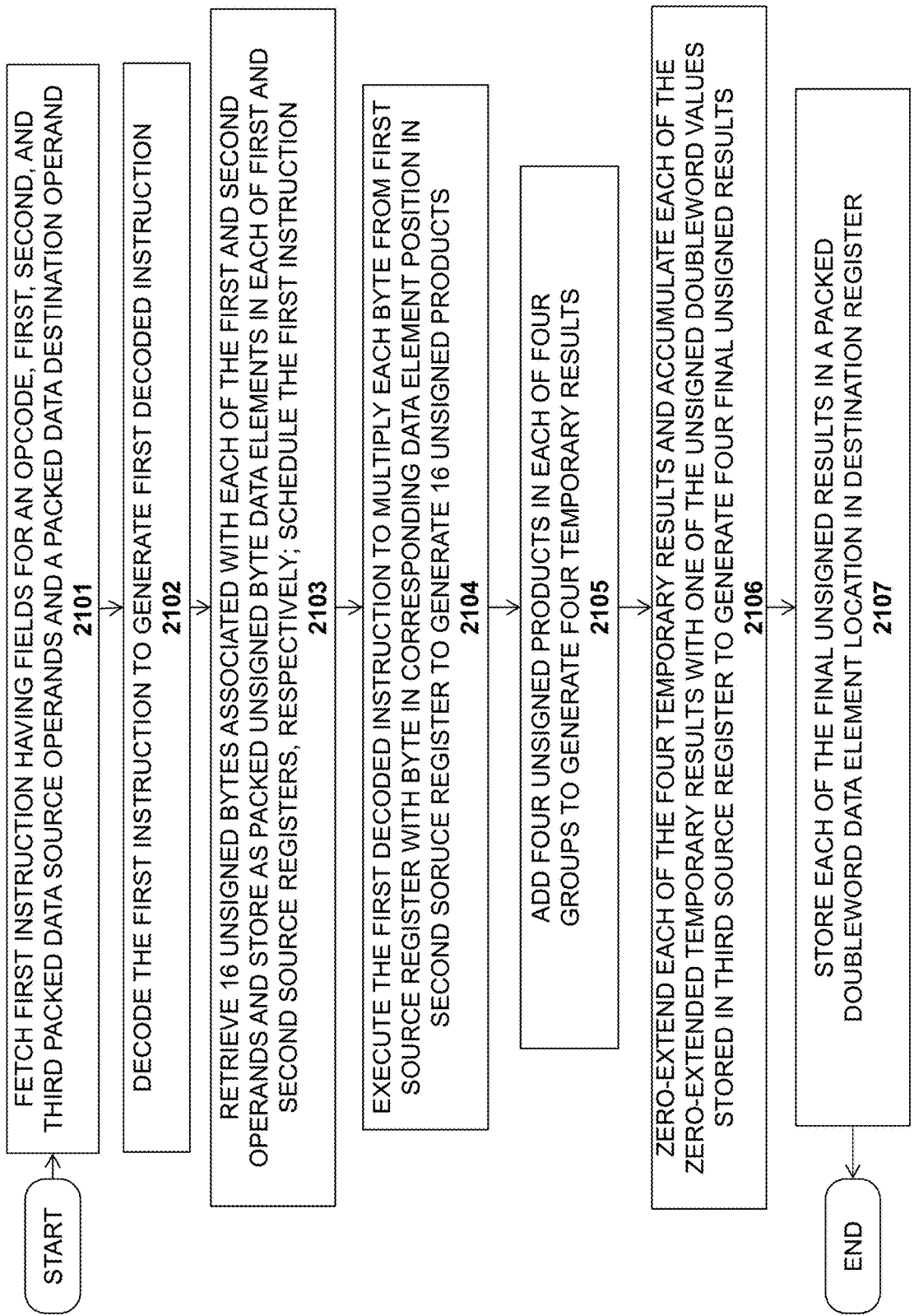
FIG. 21 illustrates a method in accordance with one embodiment of the invention.

A method in accordance with one embodiment of the invention is illustrated in FIG. 21. The method may be implemented within the context of the processor and system architectures described above but is not limited to any particular system architecture.

At 2101, a first instruction is fetched having fields for an opcode and first, second, and third packed data source operands and a packed data destination operand. At 2102 the first instruction is decoded to generate a first decoded instruction (e.g., into a plurality of microoperations). At 2103, first and second sets of 16 unsigned bytes are retrieved for each of the first and second operands, respectively, and stored as packed unsigned byte data elements in each of the first and second source registers, respectively.

At 2104 the first decoded instruction is executed to multiply each byte from the first source register with a corresponding byte in the second source register to generate 16 unsigned products. At 2105, four of the unsigned products are added in each of four groups to generate four temporary results.

At 2106, each of the four temporary results are zero-extended and accumulated with one of the unsigned doubleword values stored in the third source register which may be the same physical register as the destination register. For example, each of the four temporary results, TEMP0, TEMP1, TEMP2, and TEMP3, may be extended to 32 bits and added to the current values in DEST 1460 at doubleword data element locations A-B, C-D, E-F, and G-H, respectively (see FIG. 14A). At 2107, the each of the final unsigned results are stored in a packed doubleword data element location in the destination register DEST 1460.

Although not shown in FIG. 21, shift operations described herein may be performed on the final unsigned results. For example, the results may be right-shifted or left-shifted and a most significant portion of the shifted result may be stored to a least significant portion of a destination register. In addition, saturation and/or routing may be performed to generate the final results.

Figure 22:
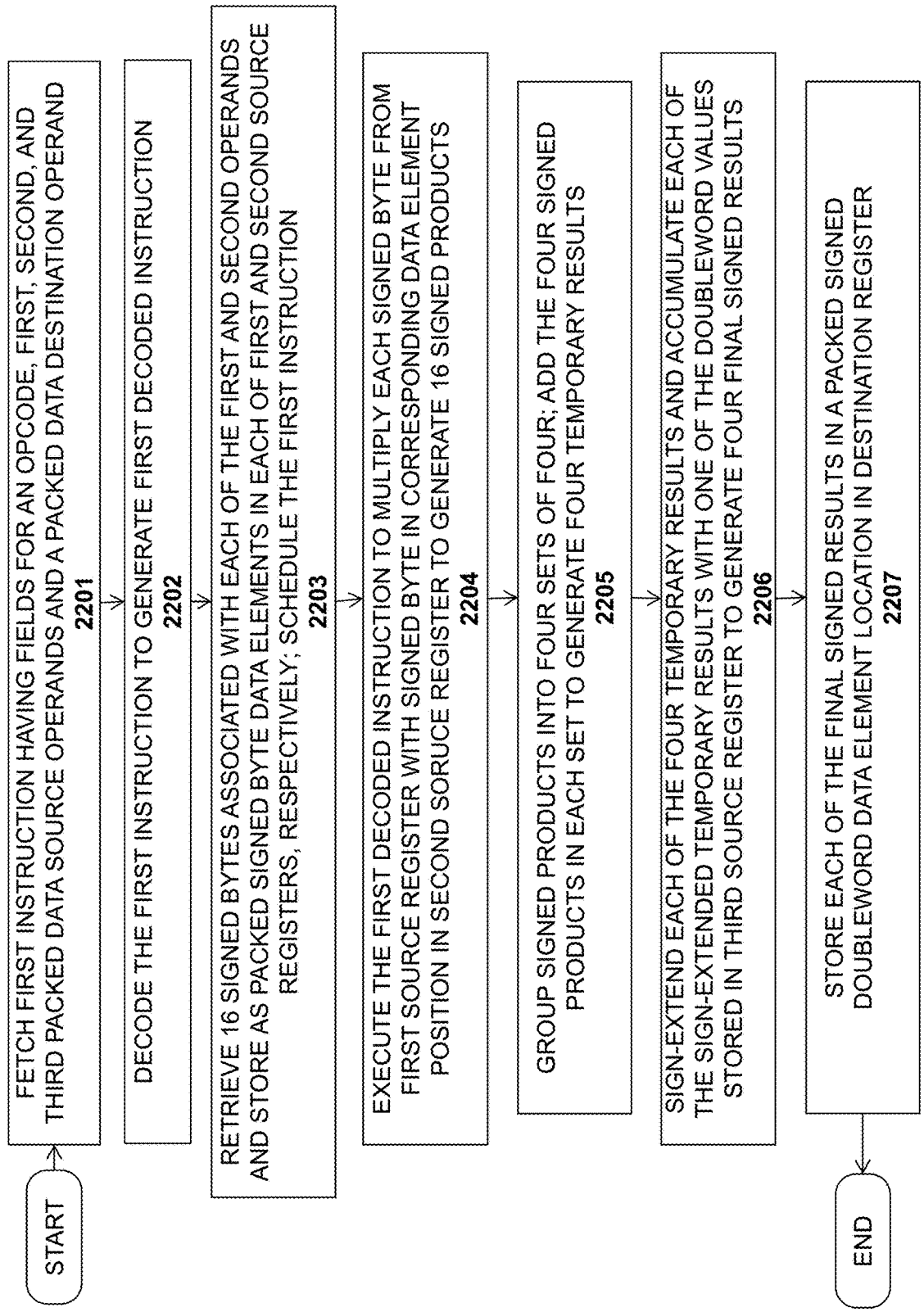
FIG. 22 illustrates a method in accordance with another embodiment of the invention.

A method in accordance with one embodiment of the invention is illustrated in FIG. 22. The method may be implemented within the context of the processor and system architectures described above but is not limited to any particular system architecture.

At 2201, a first instruction is fetched having fields for an opcode and first, second, and third packed data source operands and a packed data destination operand. At 2202 the first instruction is decoded to generate a first decoded instruction (e.g., into a plurality of microoperations). At 2203, first and second sets of 16 signed bytes are retrieved for each of the first and second operands, respectively, and stored as packed signed byte data elements in each of the first and second source registers, respectively.

At 2204 the first decoded instruction is executed to multiply each byte from the first source register with a corresponding byte in the second source register to generate 16 signed products. At 2205, four of the signed products are added in each of four groups to generate four temporary results.

At 2206, each of the four temporary results are sign-extended and accumulated with one of the signed double-word values stored in the third source register which may be the same physical register as the destination register. For example, each of the four temporary results, TEMP0, TEMP1, TEMP2, and TEMP3, may be extended to 32 bits and added to the current values in DEST 1460 at doubleword data element locations A-B, C-D, E-F, and G-H, respectively (see FIG. 14B). At 2207, the each of the final signed results are stored in a packed doubleword data element location in the destination register DEST 1460.

Although not shown in FIG. 22, shift operations described herein may be performed on the final signed results. For example, the results may be right-shifted or left-shifted and a most significant portion of the shifted result may be stored to a least significant portion of a destination register. In addition, saturation and/or routing may be performed to generate the final results.

In the foregoing specification, the embodiments of invention have been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

Embodiments of the invention may include various steps, which have been described above. The steps may be embodied in machine-executable instructions which may be used to cause a general-purpose or special-purpose processor to perform the steps. Alternatively, these steps may be performed by specific hardware components that contain hard-wired logic for performing the steps, or by any combination of programmed computer components and custom hardware components.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the Figures can be implemented using code and data stored and executed on one or more electronic devices (e.g., an end station, a network element, etc.). Such electronic devices store and communicate (internally and/or with other electronic devices over a network) code and data using computer machine-readable media, such as non-transitory computer machine-readable storage media (e.g., magnetic disks; optical disks; random access memory; read only memory; flash memory devices; phase-change memory) and transitory computer machine-readable communication media (e.g., electrical, optical, acoustical or other form of propagated signals—such as carrier waves, infrared signals, digital signals, etc.). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware. Throughout this detailed description, for the purposes of explanation, numerous specific details were set forth in order to provide a thorough understanding of the present invention. It will be apparent, however, to one skilled in the art that the invention may be practiced without some of these specific details. In certain instances, well known structures and functions were not described in elaborate detail in order to avoid obscuring the subject matter of the present invention. Accordingly, the scope and spirit of the invention should be judged in terms of the claims which follow.

What is claimed is:

1. A processor comprising:
a decoder to decode an instance of a single instruction to generate a decoded instruction, the instance of the single instruction having fields for an opcode, and operand identifiers identifying a first packed data source operand, a second packed data source operand, and a third packed data source operand;
execution circuitry to execute the decoded instruction to:
multiply each of a first plurality of packed data byte elements of the first packed data source operand with a corresponding packed data byte element of a second plurality of the second packed data source operand to generate a plurality of products;
add specified sets of the products to generate a temporary result for each set of products;
zero-extend or sign-extend the temporary result for each set to generate an extended temporary result for each set according to the opcode;
add each of the extended temporary results with a selected packed data value of the third packed data source operand to generate a plurality of 32-bit final results; and
store the plurality of final results as a plurality of packed data elements in specified data element positions of a packed data destination location.

2. The processor of claim 1, wherein the execution circuitry is to increase a bit width of each temporary result to equal a width of the selected packed data values of the third packed data source operand.

3. The processor of claim 2, wherein the third packed data source operand is also the packed data destination location.

4. The processor of claim 1, wherein the specified sets of products comprise four sets of four products, and the execution circuitry is to add the four products within each of the four sets to generate four temporary results.

5. The processor of claim 4, wherein each of the four temporary results have a width of 17 bits and the execution circuitry is to increase the width of each temporary result to 32 bits to generate the extended temporary results.

6. The processor of claim 5, wherein the execution circuitry is to add the four extended temporary results with four different packed doubleword data elements of the third packed data source operand.

7. The processor of claim 1, wherein the first, second, and third packed data source operands are each a 128-bit packed data register, and wherein the first and second packed data source operands each stores 16 packed byte data elements and the third packed data source operand stores 4 packed doubleword data elements.

8. The processor of claim 7, further comprising:
a set of temporary registers or other temporary storage locations to store the temporary result for each set of products.

9. A method comprising:
decoding an instance of a single instruction to generate a decoded instruction, the instruction having fields for an opcode, and operand identifiers identifying a first packed data source operand, a second packed data source operand, and a third packed data source operand;
executing the decoded instance of the single instruction by:
multiplying each of a first plurality of packed data byte elements of the first packed data source operand with a corresponding packed data byte element of a second plurality of the second packed data source operand to generate a plurality of products;
adding specified sets of the products to generate a temporary result for each set of products;
zero-extending or sign-extending the temporary result for each set to generate an extended temporary result for each set according to the opcode;
adding each of the extended temporary results with a selected packed data value of the third packed data source operand to generate a plurality of 32-bit final results; and
storing the plurality of final results as a plurality of packed data elements in specified data element positions of a packed data destination location.

10. The method of claim 9, wherein the zero-extending or sign-extending comprises increasing a bit width of each temporary result to equal a width of the selected packed data values of the third packed data source operand.

11. The method of claim 10, wherein the third packed data source operand is also the packed data destination location.

12. The method of claim 9, wherein the specified sets of products comprise four sets of four products, and wherein the four products within each of the four sets are added together to generate four temporary results.

13. The method of claim 12, wherein each of the four temporary results have a width of 17 bits, and wherein the zero-extending or sign-extending the temporary results comprises increasing the width of each temporary result to 32 bits to generate the extended temporary results.

14. The method of claim 13, wherein the combining comprises adding the four extended temporary results with four different packed doubleword data elements of the third packed data source operand.

15. The method of claim 9, wherein the first, second, and third packed data source operands are each a 128-bit packed data register, and wherein the first and second packed data source operands each stores 16 packed byte data elements and the third packed data source operand stores 4 packed doubleword data elements.

16. The method of claim 15, further comprising:
storing the temporary result for each set of products in a set of temporary registers or other temporary storage locations.

17. A non-transitory machine-readable medium having program code stored thereon which, when executed by a machine, causes the machine to perform the operations of:
decoding an instance of a single instruction to generate a decoded instruction, the instruction having fields for an opcode, and operand identifiers identifying a first packed data source operand, a second packed data source operand, and a third packed data source operand;
executing the decoded instance of the single instruction by:
multiplying each of a first plurality of packed data byte elements of the first packed data source operand with a corresponding packed data byte element of a second plurality of the second packed data source operand to generate a plurality of products;
adding specified sets of the products to generate a temporary result for each set of products;
zero-extending or sign-extending the temporary result for each set to generate an extended temporary result for each set;
combining each of the extended temporary results with a selected packed data value of the third packed data source operand to generate a plurality of 32-bit final results; and
storing the plurality of final results as a plurality of packed data elements in specified data element positions of a packed data destination location.

18. The non-transitory machine-readable medium of claim 17, wherein the zero-extending or sign-extending comprises increasing a bit width of each temporary result to equal a width of the selected packed data values of the third packed data source operand.

19. The non-transitory machine-readable medium of claim 18, wherein the third packed data source operand is also the packed data destination location.

20. The non-transitory machine-readable medium of claim 17, wherein the specified sets of products comprise four sets of four products, and wherein the four products within each of the four sets are added together to generate four temporary results.

21. The non-transitory machine-readable medium of claim 20, wherein each of the four temporary results have a width of 17 bits, and wherein the zero-extending or sign-extending the temporary results comprises increasing the width of each temporary result to 32 bits to generate the extended temporary results.

22. The non-transitory machine-readable medium of claim 21, wherein the combining comprises adding the four extended temporary results with four different packed doubleword data elements of the third packed data source operand.

23. The non-transitory machine-readable medium of claim 17, wherein the first, second, and third packed data source operands are each a 128-bit packed data register, and wherein the first and second packed data source operands each stores 16 packed byte data elements and the third packed data source operand stores 4 packed doubleword data elements.

24. The non-transitory machine-readable medium of claim 23, further comprising:
   storing the temporary result for each set of products in a set of temporary registers or other temporary storage locations.

* * * * *